US011925864B2

(12) United States Patent
Tago et al.

(10) Patent No.: US 11,925,864 B2
(45) Date of Patent: Mar. 12, 2024

(54) NON-TRANSITORY COMPUTER READABLE MEDIUM, INFORMATION PROCESSING METHOD, AND GAME DEVICE

(71) Applicant: CYGAMES, INC., Tokyo (JP)

(72) Inventors: Junji Tago, Tokyo (JP); Kazuya Matsunaga, Tokyo (JP)

(73) Assignee: CYGAMES, INC., Tokyo (JP)

(*) Notice: Subject to any disclaimer, the term of this patent is extended or adjusted under 35 U.S.C. 154(b) by 375 days.

(21) Appl. No.: 17/360,736

(22) Filed: Jun. 28, 2021

(65) Prior Publication Data
US 2021/0322881 A1 Oct. 21, 2021

Related U.S. Application Data

(63) Continuation of application No. PCT/JP2019/049283, filed on Dec. 17, 2019.

(30) Foreign Application Priority Data

Dec. 28, 2018 (JP) .................................. 2018-248068

(51) Int. Cl.
*A63F 13/56* (2014.01)
*A63F 13/577* (2014.01)

(52) U.S. Cl.
CPC ............ *A63F 13/56* (2014.09); *A63F 13/577* (2014.09)

(58) Field of Classification Search
CPC ...... A63F 13/56; A63F 13/577; A63F 13/833; A63F 13/422
See application file for complete search history.

(56) References Cited

U.S. PATENT DOCUMENTS

| 2003/0038428 A1 | 2/2003 | Yotoriyama |
| 2010/0267451 A1 | 10/2010 | Kawano et al. |

FOREIGN PATENT DOCUMENTS

| JP | 2003-067779 A | 3/2003 |
| JP | 2010-246851 A | 11/2010 |
| JP | 2011-210019 A | 10/2011 |
| JP | 6018269 B2 | 11/2016 |

(Continued)

OTHER PUBLICATIONS

"Bayonetta," Oct. 29, 2009, Sega, instruction manual (Year: 2009).*

(Continued)

*Primary Examiner* — Kevin Y Kim

(74) *Attorney, Agent, or Firm* — Osha Bergman Watanabe & Burton LLP

(57) ABSTRACT

A non-transitory computer readable medium stores a program causing a computer to execute: displaying a player object and a target object on a virtual game space; controlling actions of the target object, the actions including at least one attacking motion; determining an action pattern of the player object when a specific operation indicating a direction of action of the player object is input during the attacking motion of the target object, based at least on either one of or both of a position and the action of the target object, a position of the player object, the direction of the action of the player object indicated by the specific operation, and the input timing of the specific operation; and moving the player object in accordance with the determined action pattern.

8 Claims, 25 Drawing Sheets

(56) References Cited

FOREIGN PATENT DOCUMENTS

JP          2017-006210 A      1/2017
JP          2018-079059 A      5/2018

OTHER PUBLICATIONS

"How do you do a counter with Moon of Mahaa-Kalaa?," Jan. 28, 2010, GameFAQs, https://gamefaqs.gamespot.com/ps3/946345-bayonetta/answers/157981-how-do-you-do-a-counter-with-moon-of-mahaa-kalaa (Year: 2010).*

"How do i use it Moon of Mahaa-Khala ?", Jan. 9, 2010, GameFAQs, https://gamefaqs.gamespot.com/boards/946345-bayonetta/53008739 (Year: 2010).*

"Achievement Guide: Bayonetta: Touch And It Will Really Hurt," Jan. 26, 2010, YouTube, https://www.youtube.com/watch?v=3uffDa4Z8-g (Year: 2010).*

International Search Report issued in PCT/JP2019/049283 dated Mar. 17, 2020 (7 pages).

Written Opinion of the International Searching Authority issued in PCT/JP2019/049283 dated Mar. 17, 2020 (4 pages).

Gamest, "The Last Blade" Goresta, Japan, Shinseisha Co., Ltd., Feb. 15, 1998, vol. 13, No. 3, pp. 10, 11 (7 pages).

Office Action issued in the counterpart Japanese Patent Application No. 2018-248068, dated Mar. 5, 2019 (10 pages).

\* cited by examiner

| ATTACKING MOTION | ACTION MODE | MOTION TIME | COLLISION DETERMINATION TIMING |
|---|---|---|---|
| ATTACKING MOTION A | RUSH FORWARD | 1.6s | 0.5s |
| ATTACKING MOTION B | SWEEP WITH LEFT FORELEG | 1.0s | 0.5s |
| ATTACKING MOTION C | SWEEP WITH RIGHT FORELEG | 1.0s | 0.5s |
| ATTACKING MOTION D | SWEEP WITH LEFT HINDLEG | 1.0s | 0.5s |
| ATTACKING MOTION E | SWEEP WITH RIGHT HINDLEG | 1.0s | 0.5s |
| ATTACKING MOTION F | THRUST WITH LEFT FORELEG | 0.8s | 0.6s |
| ATTACKING MOTION G | THRUST WITH RIGHT FORELEG | 0.8s | 0.6s |
| ATTACKING MOTION H | SLAM WITH LEFT FORELEG | 1.5s | 0.7s |
| ATTACKING MOTION I | SLAM WITH RIGHT FORELEG | 1.5s | 0.7s |
| ATTACKING MOTION J | SLAM WITH LEFT HINDLEG | 1.5s | 0.7s |
| ATTACKING MOTION K | SLAM WITH RIGHT HINDLEG | 1.5s | 0.7s |

FIG.4

| INSTRUCTED DIRECTION OF AVOIDING OPERATION | POSITION AT END OF GENERIC AVOIDING MOTION (ACTION COMPLETION POSITION) | ACTION PATTERN OF GENERIC AVOIDING MOTION |
|---|---|---|
| FRONT (NO INSTRUCTED DIRECTION) | OUTSIDE ATTACK RANGE | FRONT SHORT-DISTANCE PATTERN |
| | SHORT-DISTANCE PATTERN IN ATTACK RANGE | FRONT LONG-DISTANCE PATTERN |
| FRONT LEFT | OUTSIDE ATTACK RANGE | FRONT-LEFT SHORT-DISTANCE PATTERN |
| | SHORT-DISTANCE PATTERN IN ATTACK RANGE | FRONT-LEFT LONG-DISTANCE PATTERN |
| FRONT RIGHT | OUTSIDE ATTACK RANGE | FRONT-RIGHT SHORT-DISTANCE PATTERN |
| | SHORT-DISTANCE PATTERN IN ATTACK RANGE | FRONT-RIGHT LONG-DISTANCE PATTERN |
| REAR LEFT | OUTSIDE ATTACK RANGE | REAR-LEFT SHORT-DISTANCE PATTERN |
| | SHORT-DISTANCE PATTERN IN ATTACK RANGE | REAR-LEFT LONG-DISTANCE PATTERN |
| REAR RIGHT | OUTSIDE ATTACK RANGE | REAR-RIGHT SHORT-DISTANCE PATTERN |
| | SHORT-DISTANCE PATTERN IN ATTACK RANGE | REAR-RIGHT LONG-DISTANCE PATTERN |

FIG.8B

| ATTACKING MOTION | START-ENABLED TIMING (TIME ELAPSED SINCE START OF ATTACKING MOTION) |
|---|---|
| ATTACKING MOTION A | 0.3s |
| ATTACKING MOTION B | 0.3s |
| ATTACKING MOTION C | 0.3s |
| ATTACKING MOTION D | 0.3s |
| ATTACKING MOTION E | 0.3s |
| ATTACKING MOTION F | 0.5s |
| ATTACKING MOTION G | 0.5s |
| ATTACKING MOTION H | 0.4s |
| ATTACKING MOTION I | 0.4s |
| ATTACKING MOTION J | 0.4s |
| ATTACKING MOTION K | 0.4s |

FIG.9A

| INSTRUCTED DIRECTION OF AVOIDING OPERATION | ACTION PATTERN OF WAITING MOTION |
|---|---|
| FRONT (NO INSTRUCTED DIRECTION) | PATTERN F |
| FRONT LEFT | PATTERN LF |
| FRONT RIGHT | PATTERN RF |
| REAR LEFT | PATTERN LB |
| REAR RIGHT | PATTERN RB |

FIG.9B

| SPECIAL INVOCATION CONDITION |
|---|
| INPUT TIMING OF AVOIDING OPERATION |
| POSITION OF PLAYER CHARACTER |
| INSTRUCTED DIRECTION OF AVOIDING OPERATION |

FIG.12A

| ATTACKING MOTION | INVOCATION-ENABLED TIMING (TIME ELAPSED SINCE START OF ATTACKING MOTION) |
|---|---|
| ATTACKING MOTION A | 0.4~0.5s |
| ATTACKING MOTION B | 0.2~0.3s |
| ATTACKING MOTION C | 0.2~0.3s |
| ATTACKING MOTION D | 0.2~0.3s |
| ATTACKING MOTION E | 0.2~0.3s |
| ATTACKING MOTION F | 0.3~0.5s |
| ATTACKING MOTION G | 0.3~0.5s |

FIG.12B

| ATTACKING MOTION | INVOCATION -ENABLED RANGE | CORRESPONDING BASE POINT SECTION | ACTION PATTERN OF SPECIAL AVOIDING MOTION |
|---|---|---|---|
| ATTACKING MOTION A | Ba4 | P3 | PATTERN A1 |
| | Ba5 | P1 | PATTERN A2 |
| ATTACKING MOTION B | Ba6 | P3 | PATTERN B1 |
| | Ba7 | P2 | PATTERN B2 |
| ATTACKING MOTION C | Ba8 | P2 | PATTERN C1 |
| | Ba9 | P3 | PATTERN C2 |
| ATTACKING MOTION D | Ba10 | P3 | PATTERN D1 |
| | Ba11 | P2 | PATTERN D2 |
| ATTACKING MOTION E | Ba12 | P2 | PATTERN E1 |
| | Ba13 | P1 | PATTERN E2 |
| ATTACKING MOTION F | Ba14 | P2 | PATTERN F |

FIG.12C

| ATTACKING MOTION | INSTRUCTED DIRECTION OF AVOIDING OPERATION |
|---|---|
| ATTACKING MOTION A | $-30° \leq \theta \leq +30°$ |
| ATTACKING MOTION B | $-45° \leq \theta \leq +45°$ |
| ATTACKING MOTION C | $-45° \leq \theta \leq +45°$ |
| ATTACKING MOTION D | $-45° \leq \theta \leq +45°$ |
| ATTACKING MOTION E | $-45° \leq \theta \leq +45°$ |
| ATTACKING MOTION F | $-60° \leq \theta \leq +60°$ |
| ATTACKING MOTION G | $-60° \leq \theta \leq +60°$ |

FIG.12D

NON-TRANSITORY COMPUTER READABLE MEDIUM, INFORMATION PROCESSING METHOD, AND GAME DEVICE

CROSS REFERENCE TO RELATED APPLICATIONS

This application is a continuation application of International Application No. PCT/JP2019/049283, filed on Dec. 17, 2019, which claims priority to Japanese Patent Application No. 2018-248068, filed on Dec. 28, 2018, the entire contents of which are incorporated by reference herein.

BACKGROUND ART

Technical Field

The present invention relates to information processing programs, information processing methods, and game devices.

Action games of the type in which a player character and an enemy character are disposed in a virtual game space have hitherto been known, as disclosed, for example, in Patent Literature 1. In this type of action game, a player character performs actions in the game space according to operations of a controller by a player.

Specifically, when an attacking operation is performed by the player, the player character performs an attacking motion. At this time, an attack range is set in association with the attacking motion, and if an enemy character is included in the attack range, the enemy character is damaged.

Furthermore, when an avoiding operation is performed by the player, the player character performs a predetermined avoiding motion, such as rolling (a rolling action). During the avoiding motion, the player character PC is in an invincible state for a certain period in which the player character PC is not susceptible to damage. Therefore, by performing an avoiding motion at a suitable timing during an attacking motion by the enemy character, it is possible to avoid the attack by the enemy character, i.e., to avoid being damaged.

CITATION LIST

Patent Literature

Patent Literature 1: JP 6018269 B

SUMMARY OF INVENTION

Technical Problem

Depending on the timing at which an avoiding motion is performed or the direction of an avoiding motion, however, the player character may come into a positional relationship in which the player character is clearly susceptible to the attack by the enemy character. That is, there is a problem in that the player perceives unnaturalness because even though it appears that the attack by the enemy character has hit, processing for the case where the attack has been avoided is actually executed.

It is an object of the present invention to provide an information processing program, an information processing method, and a game device that make it possible to alleviate unnaturalness that is perceived by a player.

Solution to Problem

In order to solve the problem described above, an information processing program causes a computer to function as: a target control unit that controls actions of a target object disposed in a virtual game space, the actions at least including an attacking motion; a determination unit that determines an action pattern in the case where a specific operation with which it is possible to identify an instructed direction in the game space is input during the attacking motion of the target object, at least on the basis of determination information set in accordance with either one of or both of the position and an action of the target object, position information of a player object disposed in the game space, the instructed direction of the specific operation, and the input timing of the specific operation; and a player control unit that causes the player object to perform an action according to the determined action pattern.

Furthermore, the information processing program may further cause the computer to function as: a setting unit that sets attack range information corresponding to the attacking motion; and a collision determination unit that determines whether or not a collision occurs at least on the basis of the attack range information and the position information of the player object, and the determination information may include the attack range information.

Furthermore, the collision determination unit may determine whether or not the collision occurs at a preset collision determination timing between the start and the end of the attacking motion, and the determination unit may determine the action pattern on the basis of the collision determination timing.

Furthermore, a plurality of kinds of the attacking motion of the target object may be provided, the action pattern that can be selected may be associated in advance with each of the attacking motions, the determination information may include the kind of the attacking motion being controlled, and the determination unit may be able to determine the action pattern associated with the kind of the attacking motion being controlled.

Base point information that changes as the position of the target object changes may be provided, and the player control unit may cause the player object to perform an action on the basis of the base point information.

Furthermore, the action pattern may include a waiting motion that is executed for the duration of a wait time set in accordance with the input timing of the specific operation.

In order to solve the problem described above, an information processing method includes: a step of controlling actions of a target object disposed in a virtual game space, the actions at least including an attacking motion; a step of determining an action pattern in the case where a specific operation with which it is possible to identify an instructed direction in the game space is input during the attacking motion, at least on the basis of determination information set in accordance with either one of or both of the position and an action of the target object, position information of a player object disposed in the game space, the instructed direction of the specific operation, and the input timing of the specific operation; and a step of causing the player object to perform an action according to the determined action pattern.

In order to solve the problem described above, a game device includes: a target control unit that controls actions of a target object disposed in a virtual game space, the actions at least including an attacking motion; a determination unit that determines an action pattern in the case where a specific operation with which it is possible to identify an instructed direction in the game space is input during the attacking motion, at least on the basis of determination information set in accordance with either one of or both of the position and an action of the target object, position information of a player object disposed in the game space, the instructed direction of the specific operation, and the input timing of the specific operation; and a player control unit that causes the player object to perform an action according to the determined action pattern.

Effects of Disclosure

The present invention makes it possible to alleviate unnaturalness that is perceived by a player.

BRIEF DESCRIPTION OF DRAWINGS

FIG. 4 is a figure for explaining example attacking motions.

FIG. 8B is a figure for explaining action patterns of the generic avoiding motion.

FIG. 9A is a figure for explaining start-enabled timings set for attacking motions.

FIG. 9B is a figure for explaining action patterns of a waiting motion.

FIG. 12A is a figure for explaining a special invocation condition.

FIG. 12B is a figure for explaining invocation-enabled timings of the special avoiding motion.

FIG. 12C is a figure for explaining the relationships among attacking motions, invocation-enabled ranges, base point sections, and action patterns of the special avoiding motion.

FIG. 12D is a figure for explaining instructed directions of avoiding operations, serving as the special invocation condition.

DESCRIPTION OF EMBODIMENTS

An aspect of an embodiment of the present invention will be described below in detail with reference to the accompanying drawings. The dimensions, materials, other specific numerals, etc. given in this embodiment are merely examples for facilitating understanding, and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

Overall Configuration of Information Processing System S

Figure 1:
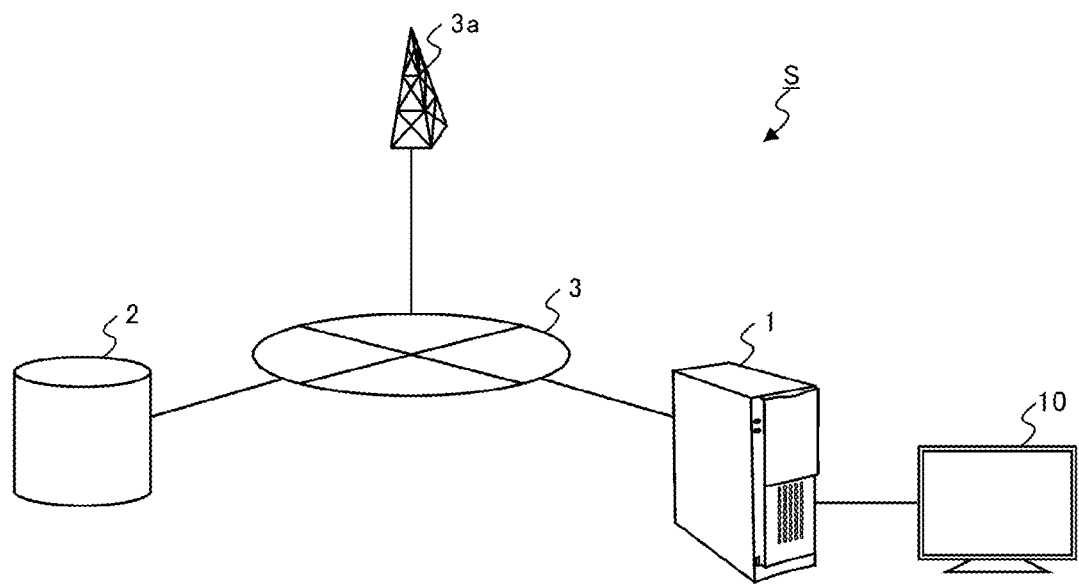
FIG. 1 is an explanatory illustration schematically showing the configuration of an information processing system.

FIG. 1 is an explanatory illustration schematically showing the configuration of an information processing system S. The information processing system S is what is called a client-server system including a game device 1, a server 2, and a communication network 3 having a communication base station 3a.

The game device 1 realizes a battle game in which a player character combats an enemy character. Examples of the game device 1 include a special game appliance for playing the game, a mobile phone such as a smartphone, a tablet, and a personal computer. This embodiment will be described in the context of the case where the game device 1 is implemented by a special game device. The game device 1 can be connected to a display 10 via a communication cable, and controls image display on the display 10.

The game device 1 can establish communication with the server 2 via the communication network 3. Note, however, that the game device 1 need not necessarily have a communication function. Furthermore, although the display 10 is provided separately from the game device 1, the display 10 may be included in the game device 1.

The server 2 is communicatively connected to a plurality of game devices 1. The server 2 accumulates various kinds of information for each player who plays the game. Furthermore, the server 2 updates the accumulated information on the basis of operations input from the game devices 1.

The communication base station 3a is connected to the communication network 3, and sends information to and receives information from the game devices 1 in a wireless manner. The communication network 3 is implemented by a mobile phone network, an Internet network, a local area network (LAN), a special circuit, or the like, and realizes wireless or wired communication connection between the game devices 1 and the server 2.

Hardware Configuration of Game Device 1

Figure 2:
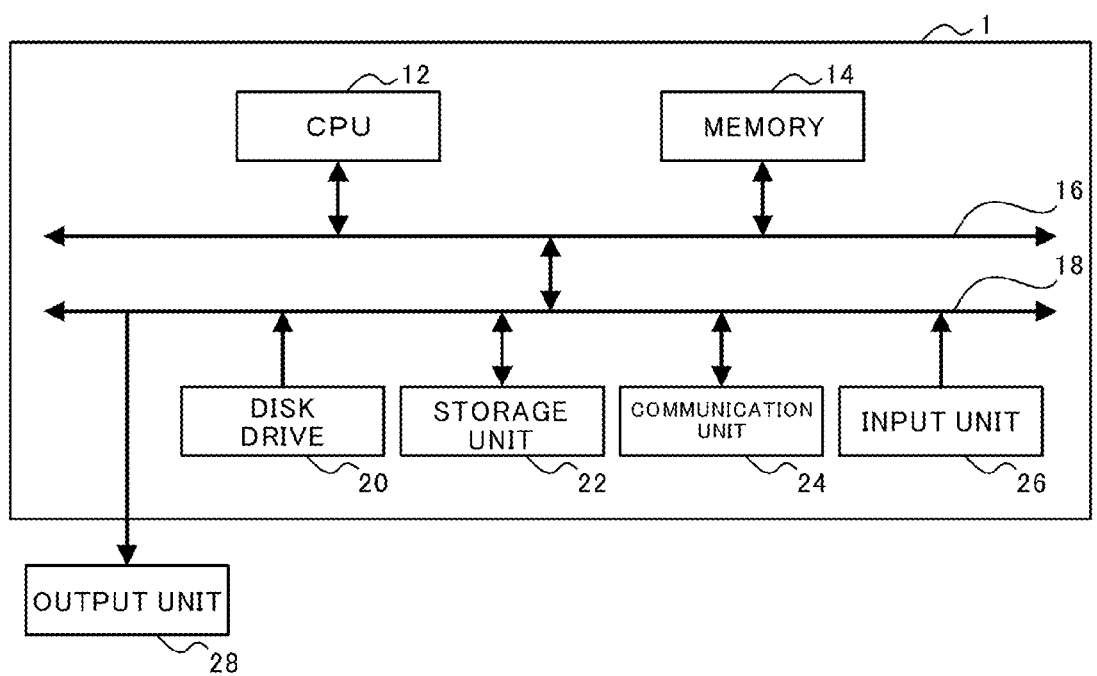
FIG. 2 is a diagram for explaining the hardware configuration of a game device.

FIG. 2 is a diagram showing the hardware configuration of the game device 1. As shown in FIG. 2, the game device 1 is configured to include a central processing unit (CPU) 12, a memory 14, a bus 16, an input/output interface 18, a disk drive 20, a storage unit 22, a communication unit 24, and an input unit 26.

The CPU 12 runs a program stored in the memory 14 to control the proceeding of the game. The memory 14 is configured of a read only memory (ROM) or a random access memory (RAM), and stores the program and various kinds of data needed for controlling the proceeding of the game. The memory 14 is connected to the CPU 12 via the bus 16.

The input/output interface 18 is connected to the bus 16. The disk drive 20, the storage unit 22, the communication unit 24, and the input unit 26 are connected to the input/output interface 18.

The disk drive 20 reads a storage medium in which a game program is stored. The storage unit 22 is configured of a semiconductor memory, such as a dynamic random access memory (DRAM), and stores various kinds of programs and data. In the game device 1, programs and data stored in the storage medium inserted into the disk drive 20 or stored in the storage unit 22 are loaded into the memory 14 (RAM) by the CPU 12.

The communication unit 24 is communicatively connected to the communication base station 3a in a wireless manner and sends information to and receives information from the server 2 via the communication network 3, such as various kinds of data and programs. In the game device 1, programs, etc. received from the server 2 can be stored in the memory 14 or the storage unit 22.

The input unit 26 is configured of a unit via which player operations are input (operations are accepted), such as an analog controller, a touchscreen, buttons, a keyboard, or a mouse. Furthermore, the input unit 26 may be configured of an acceleration sensor that detects tilting or movement or a microphone that detects the player's voice. That is, the input unit 26 may include a wide variety of devices that enable the input of the player's intents in distinguishable manners. Here, a controller 30, which will be described later, is provided as the input unit 26.

Furthermore, an output unit 28 configured of the display 10 described above, a speaker, etc. is connected to the input/output interface 18. Although it is assumed here that the game device 1 does not include the output unit 28, the game device 1 may be configured to include the output unit 28.

Game Specifics

Next, the specifics of the game provided by the game device 1 (information processing system S) according to this embodiment will be described by using an example. In this embodiment, what is called an action roll playing game (RPG) is provided.

Figure 3A:
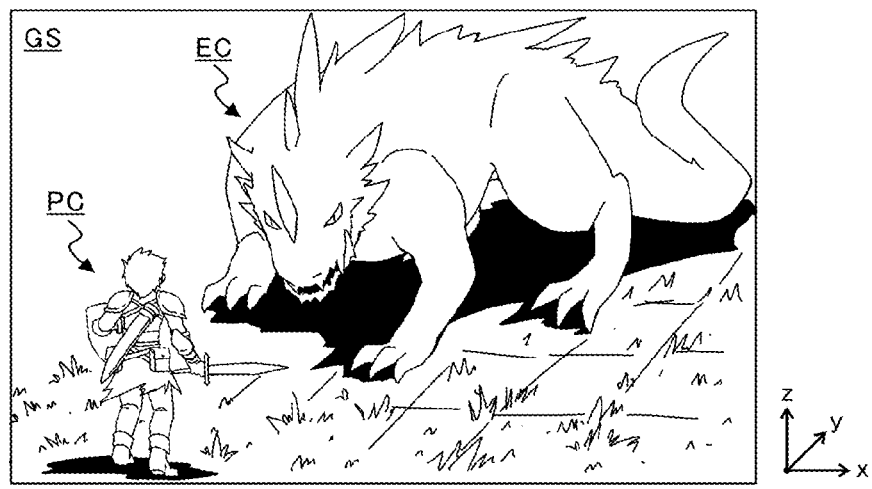
FIG. 3A is an illustration for explaining game specifics.

FIG. 3A is an illustration for explaining the game specifics. The player first sets the equipment of a player character that is operated (a player object, hereinafter referred to as the "player character PC"). The player can set a weapon for attacking an enemy character (a target object, hereinafter referred to as the "enemy character EC") and protective gear for defending against attacks by the enemy character EC.

Then, when the equipment is set, it becomes possible to play the battle game. The object of the battle game is for the player character PC to beat the enemy character EC. In the battle game, the player operates the controller 30 to move the player character PC or to perform an attacking motion against the enemy character EC.

The player character PC and the enemy character EC have life points HP individually set therefor. When an attack by the player character PC hits the enemy character EC, damage points are assigned to the enemy character EC, and the damage points are subtracted from the life points HP of the enemy character EC. Meanwhile, when an attack by the enemy character EC hits the player character PC, damage points are assigned to the player character PC, and the damage points are subtracted from the life points HP of the player character PC. The battle game ends in a victory of the player when the life points HP of the enemy character EC become 0 first and ends in a defeat of the player when the life points HP of the player character PC become 0 first.

As shown in FIG. 3A, in the battle game, a virtual game space GS is displayed. The player character PC and the enemy character EC are disposed in the game space GS. In the game device 1, image processing for generating and displaying the game space GS and the characters (the player character PC and the enemy character EC) on the display 10 is executed.

For example, the game device 1 reads various kinds of data and generates a three-dimensional virtual game space GS. Then, an image of the generated game space GS as viewed from a predetermined viewpoint is captured by means of a virtual camera, whereby a two-dimensional image as viewed virtually is generated. This two-dimensional image is displayed on the display 10. In this embodiment, the game space GS includes both the three-dimensional data that is generated in the process of the image processing and the two-dimensional image that is displayed on the display 10. In the game space GS, position information along three axes, namely, an x axis, a y axis, and a z axis, shown in FIG. 3A, is defined, and character actions are controlled on the basis of the position information.

Figure 3B:
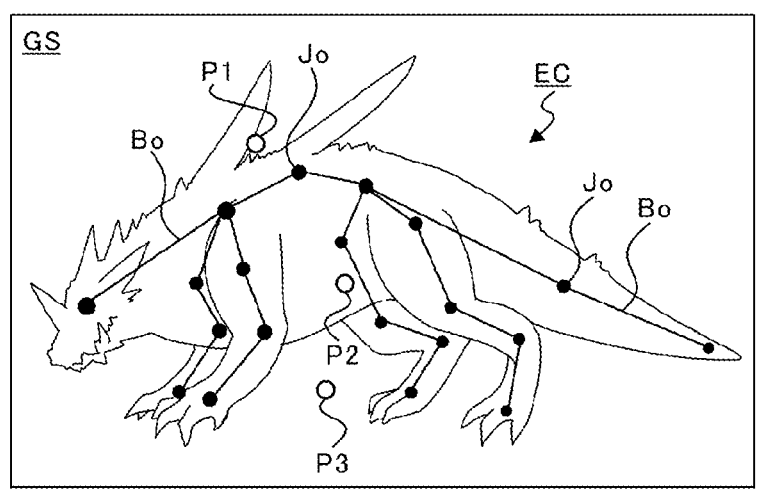
FIG. 3B is an illustration for explaining bone information of an enemy character.

FIG. 3B is an illustration for explaining bone information of the enemy character EC. The enemy character EC has bone information preset therefor, including a plurality of joints Jo (indicated by black-painted circles in FIG. 3B) and bone sections Bo connecting the joints Jo. The tilts of the bone sections Bo relative to the individual three axial directions, i.e., the posture and orientation of the enemy character EC, change according to the relative positions of the joints Jo. The actions of the enemy character EC are controlled on the basis of the bone information.

For example, a plurality of kinds of attacking motions are provided as actions of the enemy character EC. Each of the attacking motions has preset action information therefor, in which the moving trajectories and timings of all the bone sections Bo and joints Jo are defined. The actions of the enemy character EC are controlled on the basis of action information for a determined attacking motion. Note that a predetermined range around the bone sections Bo is the display range of the enemy character EC and the collision range in which an attack by the player character PC results in a hit. As described above, the bone information is information for controlling the actions and displaying of the enemy character EC. Furthermore, the bone information is used to set a collision range as well as an attack range, in which an attack by the enemy character EC hits the player character PC.

Furthermore, as indicated by white circles in FIG. 3B, base point sections P (base point information) are provided as the bone information of the enemy character EC. In this embodiment, a plurality of (three here) base point sections P1, P2, and P3 are set around the abdomen of the enemy character EC. The base point sections P move as the position of the enemy character EC changes. The base point sections P serve as information for controlling the actions of the player character PC, and is not used for controlling the actions of the enemy character EC.

Although a detailed description will be omitted, the player character PC also has bone information set therefor, and the actions and displaying of the player character PC are controlled on the basis of the bone information. That is, actions (motions) of the player character PC, including avoiding motions, which will be described later, have action information preset therefor, in which the moving trajectories and timings of all the bone sections Bo and joints Jo are defined. Furthermore, upon the input of a player operation, the action of the player character PC in the game space GS is controlled on the basis of the bone information and the action information.

Figure 3C:
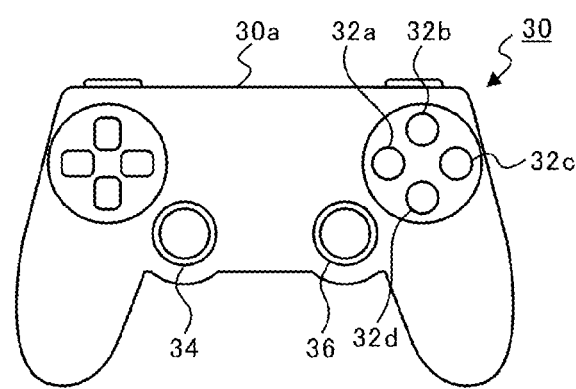
FIG. 3C is an illustration for explaining a controller.

FIG. 3C is an illustration for explaining the controller 30. The controller 30 is communicatively connected to the input/output interface 18 in a wired or wireless manner. The controller 30 includes a main unit 30a. The main unit 30a is configured to have such a shape that can be held by the player with both hands. Furthermore, the main unit 30a is provided with a plurality of operating parts for accepting player operations. Here, some of the operating parts that the controller 30 is provided with will be described.

The main unit 30a is provided with a first button 32a, a second button 32b, a third button 32c, and a fourth button 32d. The first button 32a is an operating part for accepting an attacking operation. When an operation to press the first button 32a is performed, the player character PC performs an attacking motion of swinging a sword around. The second button 32b is an operating part for drawing the sword. When an operation to press the second button 32b is performed in a state where the sword is accommodated in a sheath, the player character PC performs a sword-drawing motion to hold the sword. Meanwhile, when an operation to press the second button 32b is performed in a state where the sword is held, an action of sheathing the sword is performed.

Furthermore, when an operation to press the third button 32c is performed, the player character PC ascends or descends steps. The fourth button 32d is an operating part for accepting an avoiding operation. When an operation to press the fourth button 32d is performed, the player character PC performs an avoiding motion. During this avoiding motion, the player character PC enters an invincible state, in which the player character PC is not susceptible to attacks by the enemy character EC, i.e., is not susceptible to damage.

Furthermore, the main unit 30a is provided with a direction instructing part 34. The direction instructing part 34 is what is called an analog stick, is provided so as to project from the main unit 30a in the direction out of the sheet of the drawing, and is configured so that it can be tilted in all directions over 360°. The direction instructing part 34 is an operating part for accepting a direction instructing operation from the player. When the operation instructing part 34 is operated, the player character PC performs an action in the tilting direction (hereinafter referred to as the "instructed direction") of the direction instructing part 34.

For example, when only the direction instructing part 34 is operated, the player character PC moves in the instructed direction in the game space GS. Furthermore, when the direction instructing part 34 and the first button 32a are operated simultaneously, the player character PC performs an attacking motion in the instructed direction. Furthermore, when the direction instructing part 34 and the fourth button 32d are operated simultaneously, the player character PC performs an avoiding motion in the instructed direction.

Furthermore, the main unit 30a is provided with a right analog stick 36 having the same configuration as the direction instructing part 34. The right analog stick 36 accepts an operation for changing the angle of the game space GS displayed on the display 10. When an operation to tilt the right analog stick 36 is performed, the angle of the game space GS is changed in the tilting direction.

Attacking Motions of Enemy Character EC

Next, attacking motions of the enemy character EC will be described. During the battle game, the actions of the enemy character EC are determined according to a program. The actions of the enemy character EC include attacking motions for attacking the player character PC, damaged motions that are performed when damaged by the player character PC, and moving motions for moving.

Figure 5A:
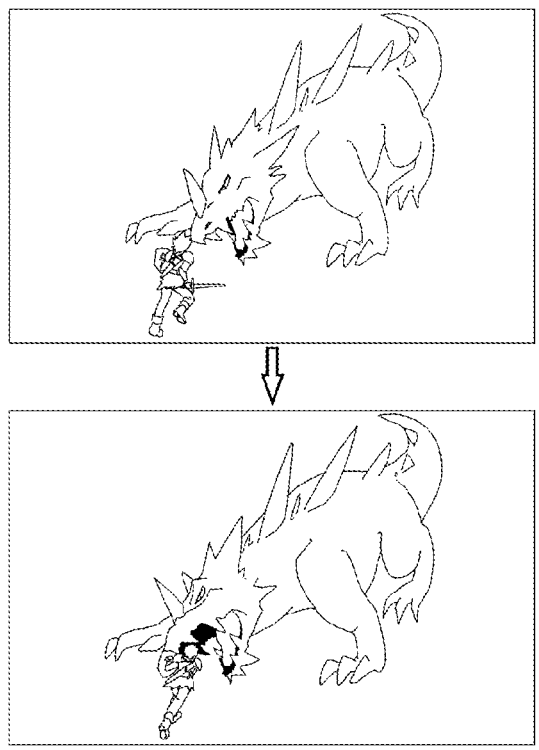
FIG. 5A is an illustration for explaining attacking motion A.
Figure 5B:
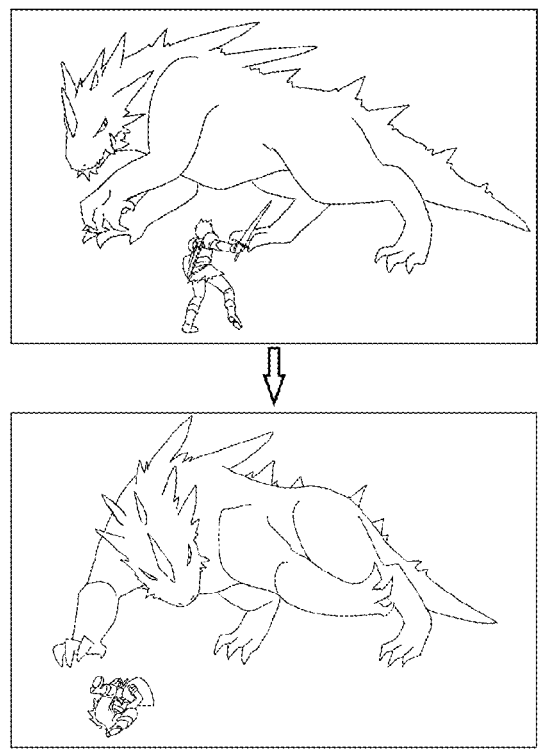
FIG. 5B is an illustration for explaining attacking motion B.

FIG. 4 is a figure for explaining example attacking motions. Furthermore, FIG. 5A is an illustration for explaining attacking motion A, and FIG. 5B is an illustration for explaining attacking motion B. As shown in FIG. 4, a plurality of kinds of attacking motions are provided, and the action mode of the enemy character EC varies among the individual attacking motions. Note that FIG. 4 shows only some of the attacking motions.

As an example, in the case where attacking motion A shown in FIG. 4 is determined, the enemy character EC performs an action of rushing forward, as shown in FIG. 5A. As another example, in the case where attacking motion B shown in FIG. 4 is determined, the enemy character EC performs an action to perform sweeping (sweep) with the left foreleg, as shown in FIG. 5B.

As described above, each attacking motion has action information preset therefor. In the action information, the positions of the joints Jo, etc. are defined at each image updating interval of the display 10 (i.e., on a per-frame basis). During an attacking motion, the action of the enemy character EC is controlled on the basis of the action information. Therefore, each attacking motion has a motion time set therefor, which is the time taken from the start to the end of the action.

For example, as shown in FIG. 4, the motion time of attacking motion A is 1.6 seconds, and the motion time of attacking motion B is 1.0 seconds. An attacking motion is finished when the motion time has elapsed, and the next action of the enemy character EC is determined when the attacking motion is finished.

Furthermore, each attacking motion has a collision determination timing set therefor. The collision determination timing is a timing for determining whether or not an attack by the enemy character EC collides with the player character PC. At the collision determination timing, a collision determination process, which will be described later, is executed. The collision determination timing is set at a predetermined timing between the start and the end of the attacking motion. For example, 0.5 seconds is set as the collision determination timings for attacking motions A and B, and 0.7 seconds is set as the collision determination timing for attacking motion K.

Each attacking motion has an attack range set therefor. In the collision determination process, it is determined whether or not the player character PC is included in the attack range. Here, it is determined that an attack has hit (hit determination) in the case where at least a portion of the player character PC is included in the attack range. Note, however, that in the collision determination process, a hit determination may be made in the case where the entirety of the player character PC is included in the attack range. As another example, a hit determination may be made in the case where a predetermined region of the player character PC is included in the attack range.

Description of Attack Range

Figure 6A:
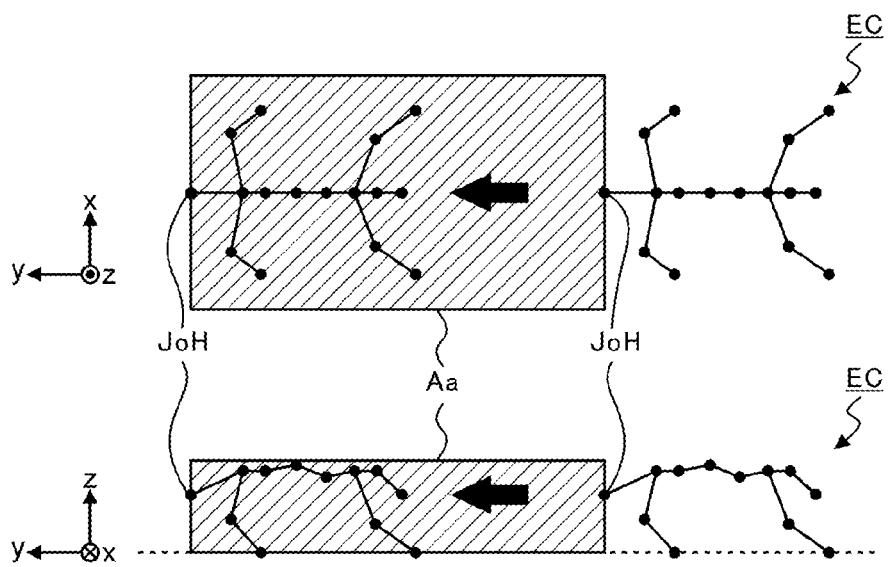
FIG. 6A is an illustration for explaining an example attack range of attacking motion A.
Figure 6B:
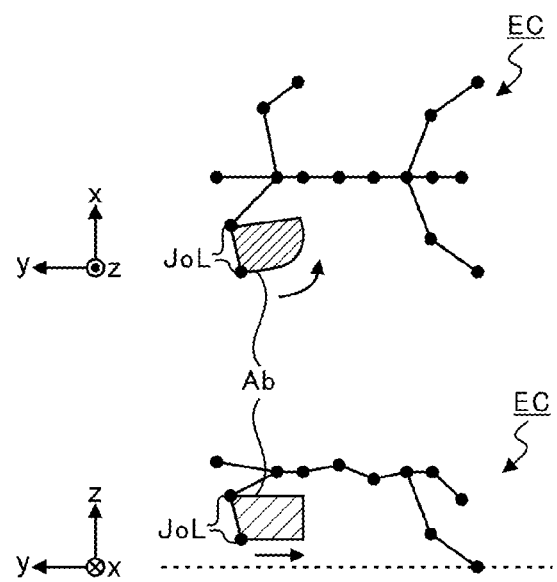
FIG. 6B is an illustration for explaining an example attack range of attacking motion B.

FIG. 6A is an illustration for explaining an example attack range of attack motion A. FIG. 6B is an illustration for explaining an example attack range of attack motion B. In FIGS. 6A and 6B, the enemy character EC is indicated in terms of the bone information. Furthermore, the upper illustrations in FIGS. 6A and 6B are illustrations in which the enemy character EC is viewed from the z direction, and the lower illustrations in FIGS. 6A and 6B are illustrations in which the enemy character EC is viewed from the x direction. The x direction in FIGS. 6A and 6B is the width direction (shoulder width direction) of the enemy character EC.

For example, in attacking motion A of the enemy character EC, the enemy character EC moves in the direction of a black arrow shown in FIG. 6A. In this case, an attack range Aa, indicated by hatching in FIG. 6A, is set. The attack range Aa is set with respect to a head joint JoH provided in the head of the enemy character EC among the joints Jo. Specifically, a predetermined range in the x direction and the z direction with respect to the head joint JoH and within the movement range of the head joint JoH in the y direction from the start to the end of attacking motion A is set as the attack range Aa. In attacking motion A, the entire body of the enemy character EC serves as an attacking part.

Furthermore, in attacking motion B of the enemy character EC, the left foreleg of the enemy character EC moves in the direction indicated by an arrow in FIG. 6B. In this case, an attack range Ab, indicated by hatching in FIG. 6B, is set. The attack range Ab is set with respect to a left foreleg joint JoL provided in the left foreleg of the enemy character EC among the joints Jo. That is, in attacking motion B, the left foreleg of the enemy character EC serves as an attacking part.

As described above, the attack range is set for each attacking motion. Furthermore, the attack range is set so as to substantially coincide with the apparent moving trajectory of the attacking part of the enemy character EC. Furthermore, at a collision determination timing, a hit determination is made in the case where the player character PC is included in the attack range. Therefore, strictly speaking, there are cases where the attacking part of the enemy character EC has not come into contact with the player character PC at the collision determination timing. However, since an attacking motion is finished in an extremely short time and the attack range is set only in the vicinity of the attacking part, the player hardly perceives unnaturalness.

Furthermore, the player can cause the player character PC to perform an avoiding motion by performing an avoiding operation. As described earlier, an avoiding operation is performed with the direction instructing part 34 and the fourth button 32d. Usually, when an avoiding operation is performed, the player character PC performs rolling in the instructed direction of the direction instructing part 34. Rolling is an action in which the player character PC moves while rolling on the ground.

Furthermore, during an avoiding motion of the player character PC, an invincible period is set. During this invincible period, the player character PC enters an invincible state, in which the player character PC is not susceptible to an attack by the enemy character EC even if the player character PC is included in the attack range of the enemy character EC. More specifically, a collision determination timing arrives after the elapse of a predetermined time after the start of an attacking motion by the enemy character EC. At the collision determination timing, it is determined whether or not the player character PC is included in the attack range. At this time, during the invincible period, the player character PC can avoid the attack by the enemy character EC, i.e., can avoid being damaged, even if the player character PC is included in the attack range.

However, depending on the timing at which the avoiding motion is performed or the direction of the avoiding motion, the player character PC may come into a positional relationship in which the player character PC is clearly susceptible to an attack by the enemy character EC. For example, suppose that while attacking motion B is being executed and the left foreleg serving as the attacking part of the enemy character EC is being moved as shown in FIG. 6B, the player character PC rolls so as to cross the moving trajectory of the left foreleg. In this case, the player will feel unnaturalness in that the player character PC is actually not damaged at all even though it clearly appears that the player character PC collides with the left foreleg of the enemy character EC.

In this embodiment, a plurality of kinds of avoiding motions having invocation conditions set therefor are provided. Furthermore, by determining an avoiding motion according to the invocation condition when an avoiding operation is performed, the player is prevented from perceiving the unnaturalness described above.

Avoiding Motions of Player Character PC

In this embodiment, the avoiding motions are broadly classified into a normal avoiding motion, a generic avoiding motion, and a special avoiding motion. These three kinds of avoiding motions have priority levels set therefor, the priority level of the special avoiding motion being the highest, and the priority level of the normal avoiding motion being the lowest. Different invocation conditions are set individually for the special avoiding motion and the generic avoiding motion. In terms of a program, first, it is determined whether or not the invocation condition of the special avoiding motion (hereinafter referred to as the "special invocation condition") is satisfied, and the special avoiding motion is always executed in the case where it is determined that the special invocation condition is satisfied.

In the case where it is determined that the special invocation condition is not satisfied, next, it is determined whether or not the invocation condition of the generic avoiding motion (hereinafter referred to as the "generic invocation condition") is satisfied. Then, the generic avoiding motion is always executed in the case where it is determined that the generic invocation condition is satisfied. The normal avoiding motion is executed in the case where neither the special invocation condition nor the generic invocation condition is satisfied.

Note that the avoiding operation is common among the three avoiding motions. In other words, in the case where the common avoiding operation is performed, one of the three avoiding motions is executed. That is, the player is not allowed to selectively execute an avoiding motion, and an avoiding motion automatically determined according to the invocation condition is executed.

In the normal avoiding motion, the player character PC performs the rolling described earlier. When an avoiding operation is performed in the case where the enemy character EC is not performing an attacking motion, the normal avoiding motion is always determined. That is, it can be said that the condition that the enemy character EC is performing an attacking motion at the timing of the input of an avoiding operation is set as an invocation condition for the generic avoiding motion and the special avoiding motion.

Description of Generic Avoiding Motion

Figure 7:
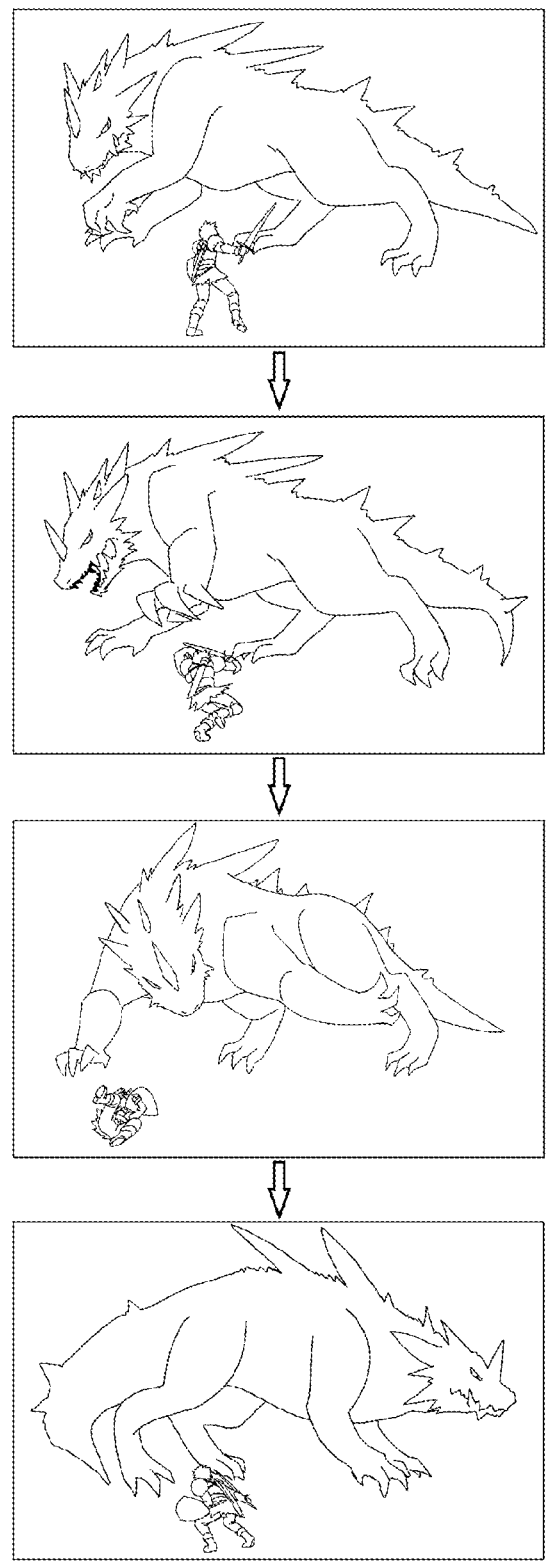
FIG. 7 is an illustration for explaining an example generic avoiding motion.

FIG. 7 is an illustration for explaining an example generic avoiding motion. The generic avoiding motion is executed when it is determined that the special invocation condition is not satisfied and the generic invocation condition is satisfied at the time of the input of an avoiding operation. Ten kinds of action patterns of the generic avoiding motion are provided in this embodiment, and FIG. 7 shows one of the action patterns (front long-distance pattern, which will be described later). For example, suppose that an avoiding operation is performed during the execution of attacking motion B of the enemy character EC and that the generic avoiding motion (front long-distance pattern) is determined.

In this case, as shown in FIG. 7, the player character PC performs rolling forward a plurality of times successively so as to go through under the left foreleg and the head of the enemy character EC. Then, the player character PC comes around to the rear left of the enemy character EC, and stands up to face the direction of the enemy character EC at a position separated from the enemy character EC by a certain distance. As described above, the generic avoiding motion is designed such that the player character PC performs a dynamic action compared with the normal avoiding motion.

Figure 8A:
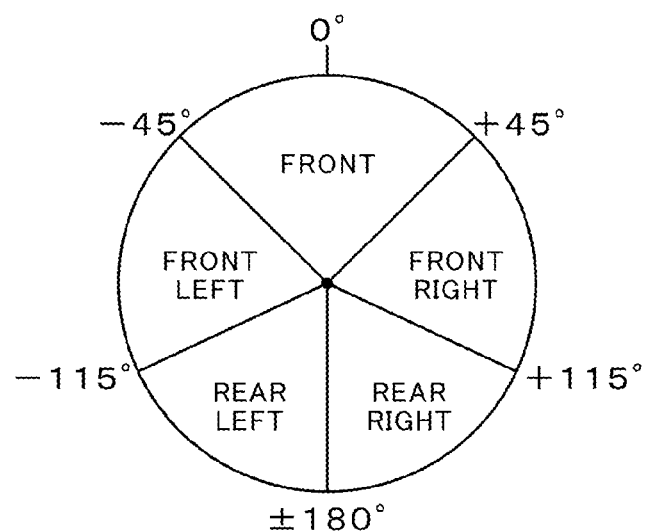
FIG. 8A is a chart for explaining avoiding motions.

FIG. 8A is a chart for explaining avoiding operations, and FIG. 8B is a figure for explaining action patterns of the generic avoiding motion. In this embodiment, the combination of an operation to press the fourth button 32d and an operation to tilt the direction instructing part 34 serves as an avoiding operation. In the avoiding operation, the tilting direction of the direction instructing part 34 is identified as the direction instructed by the player. In this embodiment, the instructed direction of the generic avoiding motion is defined as "front", "front right", "rear right", "front left", or "rear left", as shown in FIG. 8A.

Specifically, let θ signify the angle made by the tilting direction of the direction instructing part 34 and the reference direction (0° in the figure) of the direction instructing part 34. Note that the reference direction of the direction instructing part 34 coincides with the direction in which the player character PC faces in the xy plane of the game space GS. "Front" indicates the range −45°≤θ≤+45°. Similarly, "front right" indicates the range +45°<θ≤+115°, "rear right" indicates the range +115°<θ≤+180°, "front left" indicates the range −45°>θ≥−115°, and "rear left" indicates the range −115°>θ>−180°. Note that in the case where the direction instructing part 34 is not operated (no instructed direction) and only the fourth button 32d is operated, the instructed direction is considered as "front", similarly to the case of −45°≤θ≤+45°.

As shown in FIG. 8B, ten kinds of action patterns are provided for the generic avoiding motion. Each of the action patterns has set therefor an action mode, an action direction, and a movement direction of the player character PC. The action patterns of the generic avoiding motion are classified into five kinds of action patterns according to instructed directions, namely, "front pattern", "front left pattern", "front right pattern", "rear left pattern", and "rear right pattern".

With "front pattern", the player character PC moves in the direction in which the player character PC is facing when an avoiding operation is input. Furthermore, with "front left pattern", "front right pattern", "rear left pattern", and "rear right pattern", the player character PC moves respectively in predefined directions of "front left", "front right", "rear left", and "rear right" with respect to the direction in which player character PC is facing when an avoiding operation is input.

Furthermore, for each of the five action patterns classified according to instructed directions as described above, "short-distance pattern" and "long-distance pattern" are provided. "Short-distance pattern" is an action pattern in which the movement distance of the player character PC is set to be relatively short, and "long-distance pattern" is an action pattern in which the movement distance of the player character PC is set to be longer compared with "short-distance pattern".

For example, in the case where the instructed direction of an avoiding operation is "front", the action pattern of the generic avoiding motion is "front short-distance pattern" or "front long-distance pattern". With both "front short-distance pattern" and "front long-distance pattern", the player character PC moves in the direction in which the player character PC is facing when the avoiding operation is input. Note that the movement distance of the player character PC is shorter with "front short-distance pattern" than with "front long-distance pattern". Thus, the action modes of the player character PC mutually differ, for example, the numbers of times of rolling differ, between "front short-distance pattern" and "front long-distance pattern".

Although not described in detail, in the case where the instructed direction of an avoiding operation is "front left", the action pattern of the generic avoiding motion is front-left short-distance pattern" or "front-left long-distance pattern". Similarly, in the case where the instructed direction of an avoiding operation is "front right", the action pattern of the generic avoiding motion is "front-right short-distance pattern" or "front-right long-distance pattern". In the case where the instructed direction of an avoiding operation is "rear left", the action pattern of the generic avoiding motion is "rear-left short-distance pattern" or "rear-left long-distance pattern". In the case where the instructed direction of an avoiding operation is "rear right", the action pattern of the generic avoiding motion is "rear-right short-distance pattern" or "rear-right long-distance pattern". As described above, ten kinds of action patterns in total, formed by combining five kinds of instructed directions and two movement distances, are provided for the generic avoiding motion.

Here, when an action pattern of the generic avoiding motion is determined, one of "front pattern", "front left pattern", "front right pattern", "rear left pattern", and "rear right pattern" is determined on the basis of the instructed direction of the avoiding operation. At this time, in the case where it is assumed that the player character PC is caused to perform an action in "short-distance pattern" of the determined action pattern, the position of the player character PC at the time of action completion (at the end of the generic avoiding motion) (action completion position) is derived. Then, "short-distance pattern" is determined if the action completion position falls outside the attack range of the enemy character EC, and "long-distance pattern" is determined if the action completion position falls within the attack range of the enemy character EC.

Since either "short-distance pattern" or "long-distance pattern" is determined as described above, the situation where the player character PC is located within the attack range at the time of action completion is avoided. That is, the possibility that the player character PC looks as if colliding with the attacking part of the enemy character EC in the case where the generic avoiding motion is executed is reduced.

Furthermore, with the generic avoiding motion, the action mode of the player character PC is more dynamic compared with the normal avoiding motion, realizing high reality. However, with the dynamic action mode of the player character PC, there is a possibility that the player might rather perceive greater unnaturalness depending on the start timing of an attacking motion of the enemy character EC and the start timing of an avoiding motion of the player character PC.

For example, suppose that the start timing of the generic avoiding motion of the player character PC is too early for an attacking motion of the enemy character EC. In this case, the player would perceive an unnatural impression if the player character PC performed an action even though the attacking part of the enemy character EC is located at a position remote from the player character PC. Thus, in this embodiment, in the case where an avoiding operation is input, a waiting time is set in accordance with the input timing of the avoiding operation, and the player character PC performs a predetermined waiting motion for the duration of the waiting time. Then, after the execution of the waiting motion, an action based on the generic avoiding motion is started.

Description of Waiting Motion

FIG. 9A is a figure for explaining start-enabled timings set for attacking motions, and FIG. 9B is a figure for explaining action patterns of the waiting motion. When an action pattern of the generic avoiding motion is determined, it is determined whether or not to execute the waiting motion. Here, whether or not to execute the waiting motion is determined on the basis of the type of the attacking motion being executed by the enemy character EC and the input timing of an avoiding operation.

Specifically, as shown in FIG. 9A, attacking motions of the enemy character EC have individually set therefor start-enabled timings at which the generic avoiding motion can be started. The start-enabled timings are set in terms of the times elapsed from the starts of the attacking motions. For example, 0.3 seconds is set as the start-enabled timing for attacking motion A. This means that it becomes possible to start the generic avoiding motion of the player character PC after the elapse of 0.3 seconds since the start of attacking motion A.

That is, the player character PC is not allowed to execute the generic avoiding motion before the elapse of 0.3 seconds since the start of attacking motion A. In the case where the input timing of an avoiding operation is before the elapse of 0.3 seconds since the start of attacking motion A, the generic avoiding motion is executed after waiting for the start-enabled timing. In this case, the time from the input timing of the avoiding operation to the start-enabled timing is set as a waiting time.

For example, suppose that an avoiding operation is executed simultaneously with the start of attacking motion A. In this case, the time from the input timing of the avoiding operation to the start-enabled timing is 0.3 seconds. Therefore, in this case, 0.3 seconds is set as a waiting time, and the generic avoiding motion is executed after executing the waiting motion for the duration of this waiting time. Therefore, the waiting time, i.e., the execution time of the waiting motion, changes in accordance with the input timing of the avoiding operation.

As described above, in this embodiment, a waiting time may be set on the basis of the start-enabled timing set for each attacking motion. However, for example, a waiting time may be set on the basis of the position of the enemy character EC or the attack range of the enemy character EC. Specifically, in the case where the attacking part (attack range) of the enemy character EC is separated from the player character PC by at least a predetermined distance, the execution of the generic avoiding motion is postponed until the attacking part (attack range) becomes included in a predetermined range. As described above, a start-enabled area for the generic avoiding motion of the player character PC may be set for each attacking motion of the enemy character EC.

In this embodiment, as shown in FIG. 9B, five kinds of action patterns are provided for the waiting motion. An action pattern of the waiting motion is determined on the basis of the instructed direction of an avoiding operation. Specifically, in the case where the instructed direction of an avoiding operation is "front", the action pattern of the waiting motion is determined to be pattern F. Similarly, in the case where the instructed direction of an avoiding operation is "front left", "front right", "rear left", and "rear right", the action pattern of the waiting motion is determined to be pattern LF, pattern RF, pattern LB, and pattern RB, respectively.

Although not shown, for example, an action pattern of the waiting motion is an action in which the player character PC slightly bends at the waist or the player character PC slightly puts its weight in the front, rear, left, or right direction. That is, an action pattern of the waiting motion involves a small action of the player character PC and serves as a preliminary action for an action pattern of the generic avoiding motion to be executed next.

Note that in the case where an avoiding operation is input after the start-enabled timing, the waiting motion is not executed, and the generic avoiding motion is executed immediately.

As described above, the waiting motion is executed for the duration of a waiting time set in accordance with the input timing of an avoiding operation. Therefore, even if the input timing of an avoiding operation is too early for an attacking motion, the generic avoiding motion is executed at an optimal timing, so that the player does not perceive an unnatural impression. Furthermore, since the generic avoiding motion is started when the attacking part of the enemy character EC has come close to the player character PC, it is possible to let the player perceive an impression as if the attack were avoided just before hitting.

Note that here, the waiting motion is executed for the duration of a waiting time from the input timing of an avoiding operation to the start-enabled timing. That is, the execution time of the waiting motion varies depending on the input timing of the avoiding operation. However, it is possible to set execution times for the individual action patterns of the waiting motion in advance, and the waiting motion may always be executed for the duration of the set execution time. In this case, the start time of the generic avoiding motion varies depending on the input timing of the avoiding operation.

Description of Special Avoiding Motion

Figure 10:
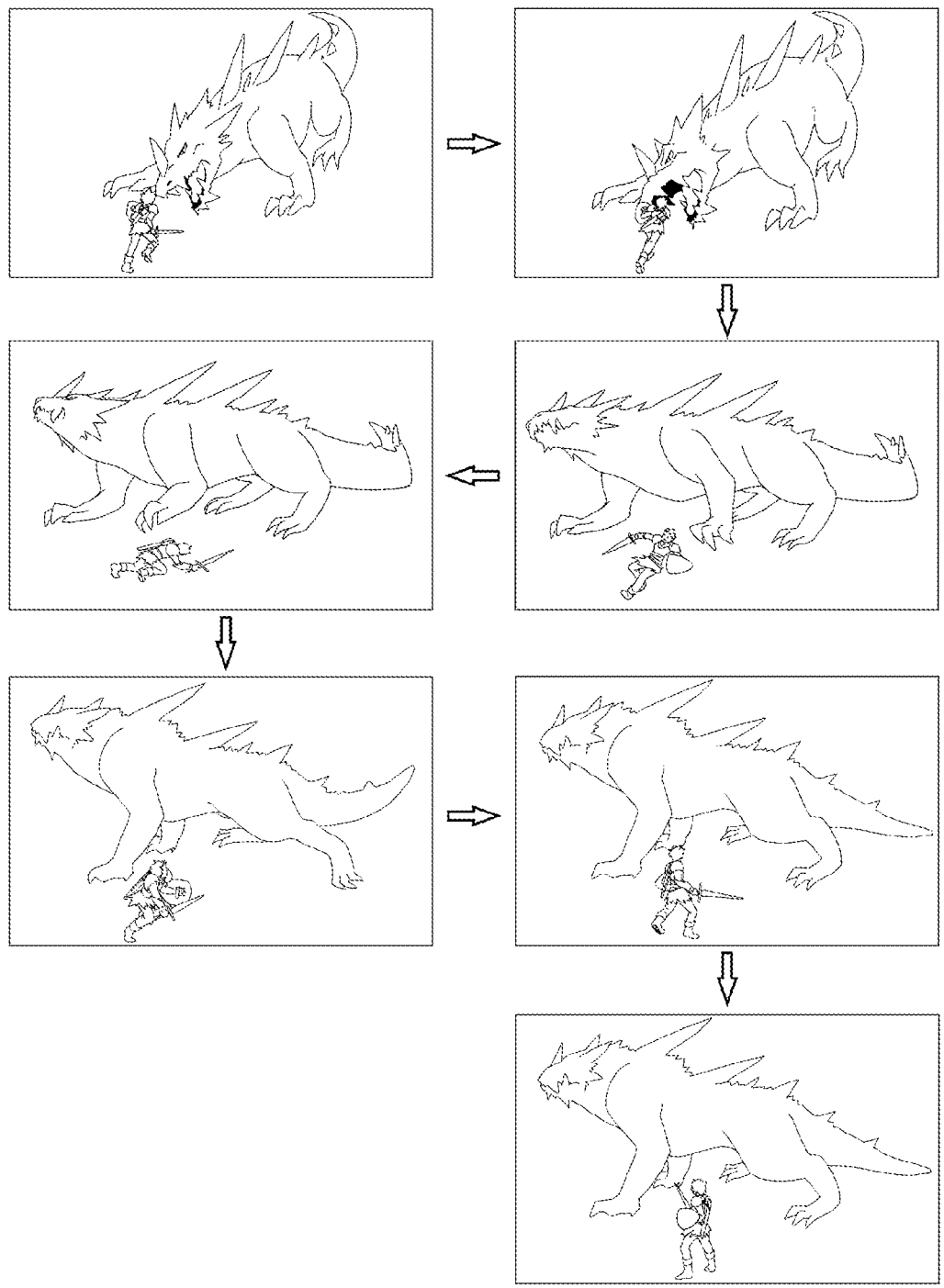
FIG. 10 is an illustration for explaining an example special avoiding motion.

FIG. 10 is an illustration for explaining an example special avoiding motion. If it is determined that the special invocation condition is satisfied when an avoiding operation is input, the special avoiding motion is executed. In this embodiment, action patterns of the special avoiding motion are set for individual attacking motions of the enemy character EC, and FIG. 10 shows one (pattern AL, which will be described later) of the action patterns of the special avoiding motion as an example. For example, suppose that an avoiding operation is executed during the execution of attacking motion A of the enemy character EC and that the special avoiding motion (pattern AL) is determined.

In this case, as shown in FIG. 10, the player character PC comes around to the outer side of the left foreleg of the rushing enemy character EC. At this time, the player character PC moves while rolling and stumbling. Then, the player character PC stands up while holding a sword at the action completion position obliquely behind the left foreleg of the enemy character EC. The special avoiding motion is designed such that the action mode of the player character PC is even more dynamic compared with the generic avoiding motion.

Furthermore, the action completion position of the player character PC in the case where the special avoiding motion is executed is a position at which it is possible to damage the left foreleg of the enemy character EC. That is, the special avoiding motion has an action pattern with which the player character PC is guided to a position where it is easy to damage the enemy character EC, while avoiding an attack by the enemy character EC.

Figure 11:
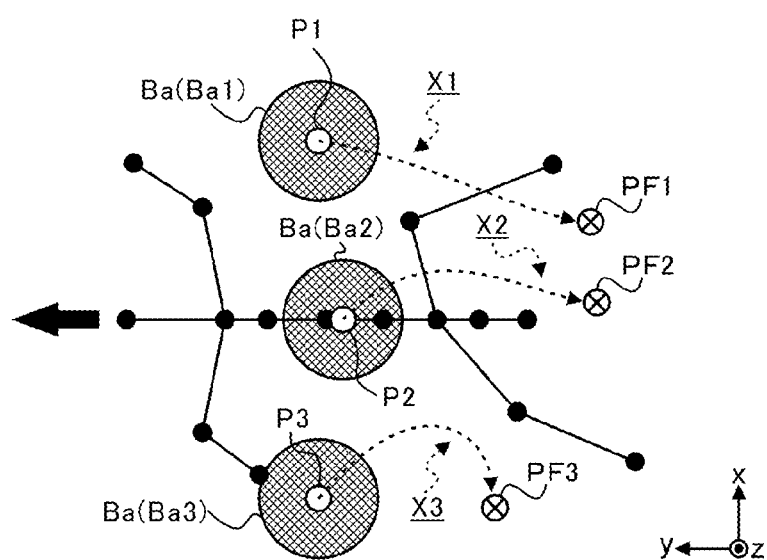
FIG. 11 is an illustration for explaining the movement path of a player character in the special avoiding motion.

FIG. 11 is an illustration for explaining a movement path of the player character PC in the special avoiding motion. Each attacking motion of the enemy character EC has an invocation-enabled range Ba (indicated by cross hatching in FIG. 11) set therefor. The invocation-enabled range Ba is a position at which it is possible to invoke the special avoiding motion. It becomes possible to execute the special avoiding motion in the case where the player character PC is located within the invocation-enabled range Ba when an avoiding operation is input.

For example, suppose that three invocation-enabled ranges Ba, namely, invocation-enabled ranges Ba1, Ba2, and Ba3, are set for a predetermined attacking motion of the enemy character EC. Note that here, the invocation-enabled ranges Ba are set at predetermined ranges centered at the base point sections P serving as bone information set to the enemy character EC. However, the relative positional relationships between the invocation-enabled ranges Ba and the base point sections P are not particularly limited. Furthermore, the number of invocation-enabled ranges Ba set for each attacking motion may be one or a plural number other than three. Furthermore, attacking motions for which invocation-enabled ranges Ba are not set may be included. The special avoiding motion is not executed during an attacking motion for which no invocation-enabled range Ba is set.

For this attacking motion, three kinds of patterns X1, X2, and X3 are set as action patterns of the special avoiding motion. That is, the special avoiding motion that is executed in relation to the attacking motion is one of the patterns X1, X2, and X3.

Here, the action patterns of the special avoiding motion are provided individually for the invocation-enabled ranges Ba. In other words, the individual action patterns of the special avoiding motion are associated with the invocation-enabled ranges Ba. Specifically, pattern X1 is associated with the invocation-enabled range Ba1, pattern X2 is associated with the invocation-enabled range Ba2, and pattern X3 is associated with the invocation-enabled range Ba3.

Furthermore, one of the three base point sections P (P1, P2, and P3) is associated with each action pattern of the special avoiding motion. That is, each action pattern of the special avoiding motion is associated with one base point section P set to the enemy character EC and one invocation-enabled range Ba.

Then, in the case where the player character PC is located in the invocation-enabled range Ba1 when an avoiding operation is input, the action pattern of the special avoiding motion is always pattern X1. Similarly, in the case where the player character PC is located in the invocation-enabled ranges Ba2 and Ba3 when an avoiding operation is input, the action pattern of the special avoiding motion is patterns X2 and X3, respectively.

For the action patterns of the special avoiding motion, the movement paths of the player character PC in relation to the enemy character EC and the action modes of the player character PC during the movement processes are set in detail, as indicated by broken arrows in FIG. 11. Here, the movement path of the player character PC, set for each action pattern, is set with respect to the associated base point section P. That is, for each action pattern, the movement path of the player character PC from the associated base point section P to the action completion position PF (PF1, PF2, or PF3 in FIG. 11) is set.

For example, suppose that the action pattern of the special avoiding motion is set to be pattern X1. In this case, the player character PC moves along the path of the broken arrow from the base point section P1 to the action completion position PF1. Note that at the start of the special avoiding motion, the player character PC moves so as to be attracted to the base point section P and performs an action according to the movement path from the base point section P. As described above, the player character PC performs an action on the basis of a base point section P in the special avoiding motion.

FIG. 12A is a figure for explaining the special invocation condition. FIG. 12B is a figure for explaining invocation-enabled timings of the special avoiding motion. FIG. 12C is a figure for explaining the relationships among attacking motions, invocation-enabled ranges Ba, base point sections P, and action patterns of the special avoiding motion. FIG. 12D is a figure for explaining instructed directions of avoiding operations, serving as the special invocation condition. Note that FIG. 12A shows some of the conditions constituting the special invocation condition, and conditions other than the conditions shown in FIG. 12A, such as the condition that an attacking motion is being performed, are set. Furthermore, FIGS. 12B, 12C, and 12D show only some of the attacking motions as examples.

As shown in FIG. 12A, the special invocation condition includes the input timing of the avoiding operation, the position of the player character PC, and the instructed direction of the avoiding operation. When an avoiding operation is input during an attacking motion of the enemy character EC, it is determined whether the current timing allows the execution of the special avoiding motion on the basis of the input timing of the avoiding operation.

As shown in FIG. 12B, each attacking motion has set therefor an invocation-enabled timing at which it becomes possible to invoke (execute) the special avoiding motion. The invocation-enabled timing is set in terms of the time elapsed since the start of the attacking motion, and is set within the motion time (the time it takes from the start to the end) of each attacking motion.

For example, for attacking motion A, for which the motion time is 1.6 seconds, 0.4 to 0.5 seconds is set as the invocation-enabled timing. This indicates that it is possible to execute the special avoiding motion in the case where an avoiding operation is input while the time elapsed since the start of attacking motion A is 0.4 to 0.5 seconds.

That is, the special avoiding motion is not executed unless an avoiding operation is performed at a preset timing during an attacking motion of the enemy character EC. As is apparent from FIG. 12B, the invocation-enabled timing is set during a very short period in the motion time. Therefore, the probability of the execution of the special avoiding motion is low also in view of the input timing of an avoiding operation.

Note that although invocation-enabled timings are individually set for attacking motions here, a common invocation-enabled timing may be set for all the attacking motions. Furthermore, an invocation-enabled timing may be set before a collision determination timing, after a collision determination timing, or across a collision determination timing.

Furthermore, as shown in FIG. 12C, each attacking motion has set therefor invocation-enabled ranges Ba in which it is possible to invoke (execute) the special avoiding motion, as well as base point sections P that serve as the start points of the movement paths of the player character PC. Furthermore, each attacking motion has set therefor an action pattern of the special avoiding motion for each invocation-enabled range Ba (base point section P). That is, each attacking motion is associated with a selectable action pattern of the special avoiding motion. Furthermore, it is possible to determine the action pattern associated with the type of the attacking motion being executed (being controlled).

As described above, it is possible to execute the special avoiding motion in the case where the player character PC is located within the invocation-enabled range Ba set for an attacking motion being executed when an avoiding operation is input. Furthermore, in the case where the player character PC is located in the invocation-enabled range Ba, the action pattern associated with the invocation-enabled range Ba is determined. With the action pattern that is determined at this time, the player character PC performs an action from the base point section P nearest to the invocation-enabled range Ba in which the player character PC is located.

Furthermore, whether or not to execute the special avoiding motion is determined on the basis of the instructed direction of an avoiding operation. As shown in FIG. 12D, each attacking motion of the enemy character EC has set therefor the instructed direction of an avoiding operation that makes it possible to execute the special avoiding motion. For example, let $\theta$ signify the angle made by a virtual line connecting the player character PC and a predetermined base point section P and an instruction line extended from the player character PC in the instructed direction. In this case, it is possible to execute the special avoiding motion if the angle $\theta$ falls within the range (permissible angle) set for each attacking motion. For example, in the case where attacking motion A is being executed, it is possible to execute the special avoiding motion if $-30° \le \theta \le +30°$.

Specifically, when an avoiding operation is performed, it is possible to execute the special avoiding motion only in the case where a direction instruction is issued in the direction from the invocation-enabled range Ba in which the player character PC is located toward the base point section P associated with the invocation-enabled range Ba. Therefore, the special avoiding motion is not executed, for example, in the case where the instructed direction of a rotating operation is a direction away from the base point section P. Thus, the player character PC is prevented from moving in a direction irrelevant to a direction instructed by the player, which prevents the player from perceiving unnaturalness.

As described above, in this embodiment, in the case where an avoiding operation is input during an attacking motion, an avoiding motion, i.e., an action pattern of the player character PC, is determined at least on the basis of the position and an action of the enemy character EC, the position of the player character PC, the instructed direction of the avoiding operation, and the input timing of the avoiding operation. As described above, since an action pattern of the player character PC is determined according to various conditions, the possibility of performing an action that causes the player to perceive unnaturalness is reduced, which makes it possible to improve reality.

Description of Control Unit of Game Device 1

A control unit of the game device 1 for determining an avoiding motion will be described below.

Figure 13:
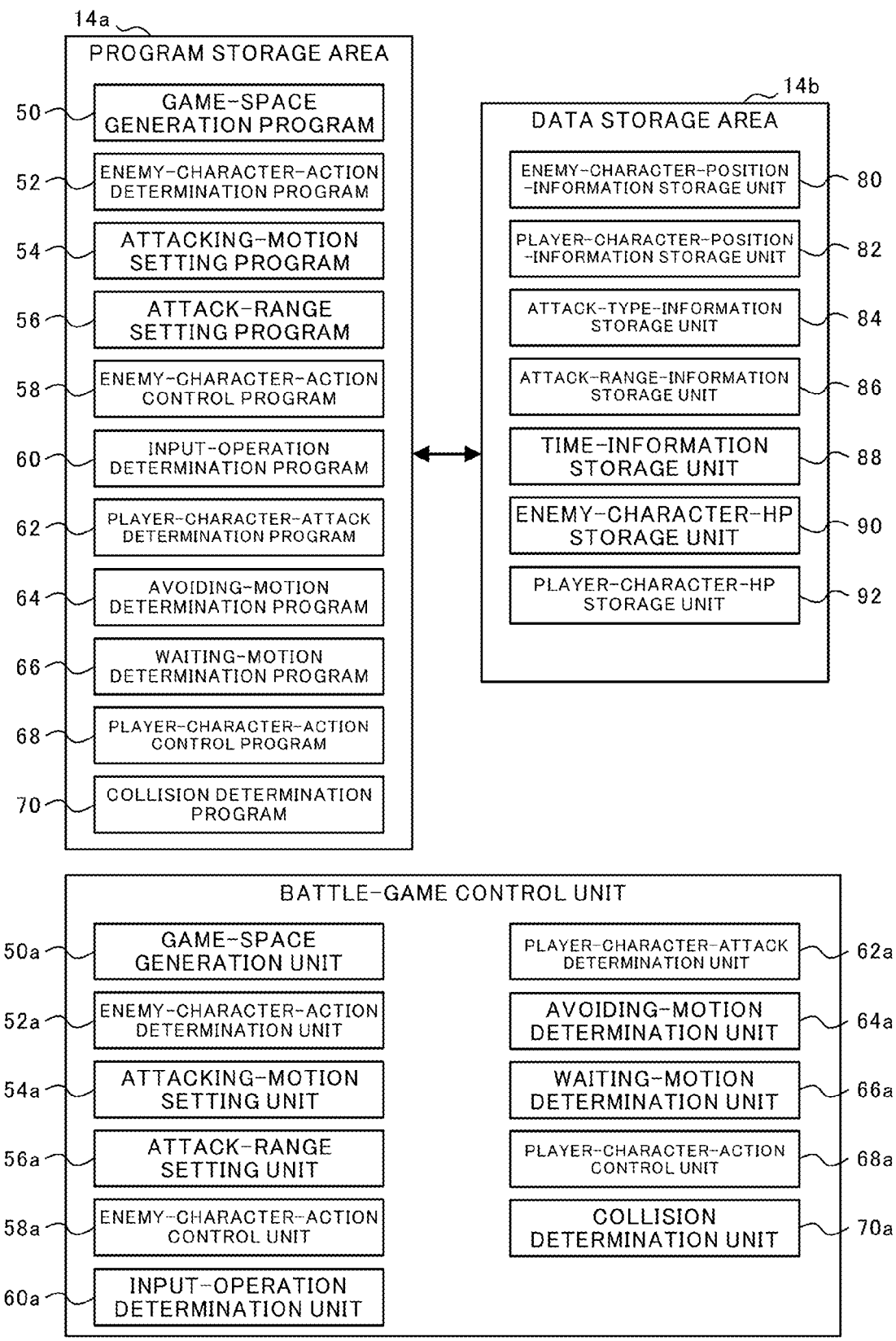
FIG. 13 is a diagram for explaining the configuration of a memory and the functions of a computer in the game device.

FIG. 13 is a diagram for explaining the configuration of the memory 14 and the functions of a computer in the game device 1. In the memory 14, a program storage area 14a and a data storage area 14b are provided. When the battle game is started, the CPU 12 stores programs (modules) for a battle-game control process in the program storage area 14a.

The programs for the battle-game control process include a game-space generation program 50, an enemy-character-action determination program 52, an attacking-motion setting program 54, an attack-range setting program 56, an enemy-character-action control program 58, an input-operation determination program 60, a player-character-attack determination program 62, an avoiding-motion determination program 64, a waiting-motion determination program 66, a player-character-action control program 68, and a collision determination program 70. Note that the programs listed in FIG. 13 are examples, and a large number of other programs for the battle-game control process are provided.

In the data storage area 14b, an enemy-character-position-information storage unit 80, a player-character-position-information storage unit 82, an attack-type-information storage unit 84, an attack-range-information storage unit 86, a time-information storage unit 88, an enemy-character-HP storage unit 90, and a player-character-HP storage unit 92 are provided as storage units for storing data. Note that the storage units listed above are examples, and a large number of other storage units are provided in the data storage area 14b.

The CPU 12 runs the individual programs stored in the program storage area 14a and updates the data in the individual storage units in the data storage area 14b. Furthermore, the CPU 12 runs the programs stored in the program storage area 14a to cause the game device 1 (computer) to function as a battle-game control unit.

Specifically, the CPU 12 runs the game-space generation program 50 to cause the computer to function as the game-space generation unit 50a. Similarly, the CPU 12 runs the enemy-character-action determination program 52, the attacking-motion setting program 54, the attack-range setting program 56, the enemy-character-action control program 58, the input-operation determination program 60, the player-character-attack determination program 62, the avoiding-motion determination program 64, the waiting-motion determination program 66, the player-character-action control program 68, and the collision determination program 70 to cause the computer to function as the enemy-character-action determination unit 52a, the attacking-motion setting unit 54a, the attack-range setting unit 56a (setting unit), the enemy-character-action control unit 58a (target control unit), the input-operation determination unit 60a, the player-character-attack determination unit 62a, the avoiding-motion determination unit 64a (determination unit), the waiting-motion determination unit 66a (determination unit), the player-character-action control unit 68a (player control unit), and a collision determination unit 70a (collision determination unit), respectively.

The game-space generation unit 50a generates and displays the game space GS on the display 10.

The enemy-character-action determination unit 52a determines an action to be executed by the enemy character EC from among preset actions (motions), such as a moving motion, an attacking motion, and a damaged motion.

The attacking-motion setting unit 54a stores attack type information in the attack-type-information storage unit 84, the attack type information indicating the type of the attacking motion determined by the enemy-character-action determination unit 52a.

The attack-range setting unit 56a stores attack range information associated with the attacking motion determined by the enemy-character-action determination unit 52a in the attack-range-information storage unit 86. The attack range information is constituted of position information indicating the range in which the attack by the enemy character EC hits. The attack-range setting unit 56a sets the attack range information on the basis of the attacking motion determined by the enemy-character-action determination unit 52a and the position information of the enemy character EC.

The enemy-character-action control unit 58a controls the actions of the enemy character EC. That is, the enemy-character-action control unit 58a causes the enemy character EC to execute the action determined by the enemy-character-action determination unit 52a in the game space GS. In other words, the enemy-character-action control unit 58a controls the displaying of the enemy character EC. Furthermore, the enemy-character-action control unit 58a stores the position information of the enemy character EC in the enemy-character-position-information storage unit 80. Furthermore, the enemy-character-action control unit 58a updates the time elapsed since the enemy character EC started various kinds of actions in the time-information storage unit 88.

The input-operation determination unit 60a determines whether or not an operation has been input from the controller 30, as well as the content of the operation input from the controller 30. That is, the input-operation determination unit 60a identifies the type of operation from among operations including an attacking operation and an avoiding operation, as well as the instructed direction.

The player-character-attack determination unit 62a determines an attacking motion to be executed by the player character PC in the case where an attacking operation has been input.

The avoiding-motion determination unit 64a determines the type of avoiding motion (the normal avoiding motion, the generic avoiding motion, or the special avoiding motion), as well as an action pattern, in the case where an avoiding operation has been input.

The waiting-motion determination unit 66a determines whether or not to execute the waiting motion, as well as an action pattern, in the case where the avoiding-motion determination unit 64a has determined the generic avoiding motion.

The player-character-action control unit 68a controls the actions of the player character PC. Specifically, the player-character-action control unit 68a causes the player character PC to execute the action determined by the player-character-action determination unit 62a, the avoiding-motion determination unit 64a, or the waiting-motion determination unit 66a in the game space GS. In other words, the player-character-action control unit 68a controls the displaying of the player character PC.

Furthermore, the player-character-action control unit 68a moves the player character PC in the instructed direction (moving motion) in the case where only the direction instructing part 34 of the controller 30 is operated. Note that the player-character-action control unit 68a stores the position information of the player character PC in the player-character-position-information storage unit 82. Furthermore, the player-character-action control unit 68a updates the time elapsed since the player character PC started various kinds of actions in the time-information storage unit 88.

The collision determination unit 70a determines whether or not an attack has hit the opponent when a collision determination timing arrives during an attacking motion of the enemy character EC or the player character PC. Furthermore, the collision determination unit 70a determines damage points in the case where it is determined that the attack has hit. Furthermore, the collision determination unit 70a subtracts the determined damage points from the life points HP of the opponent.

Description of Battle-Game Control Process

Next, the battle-game control process of the game device 1 will be described. In the following, processing relating to avoiding motions of the player character PC will be described, while omitting a description of processing not relating to avoiding motions of the player character PC.

Figure 14:
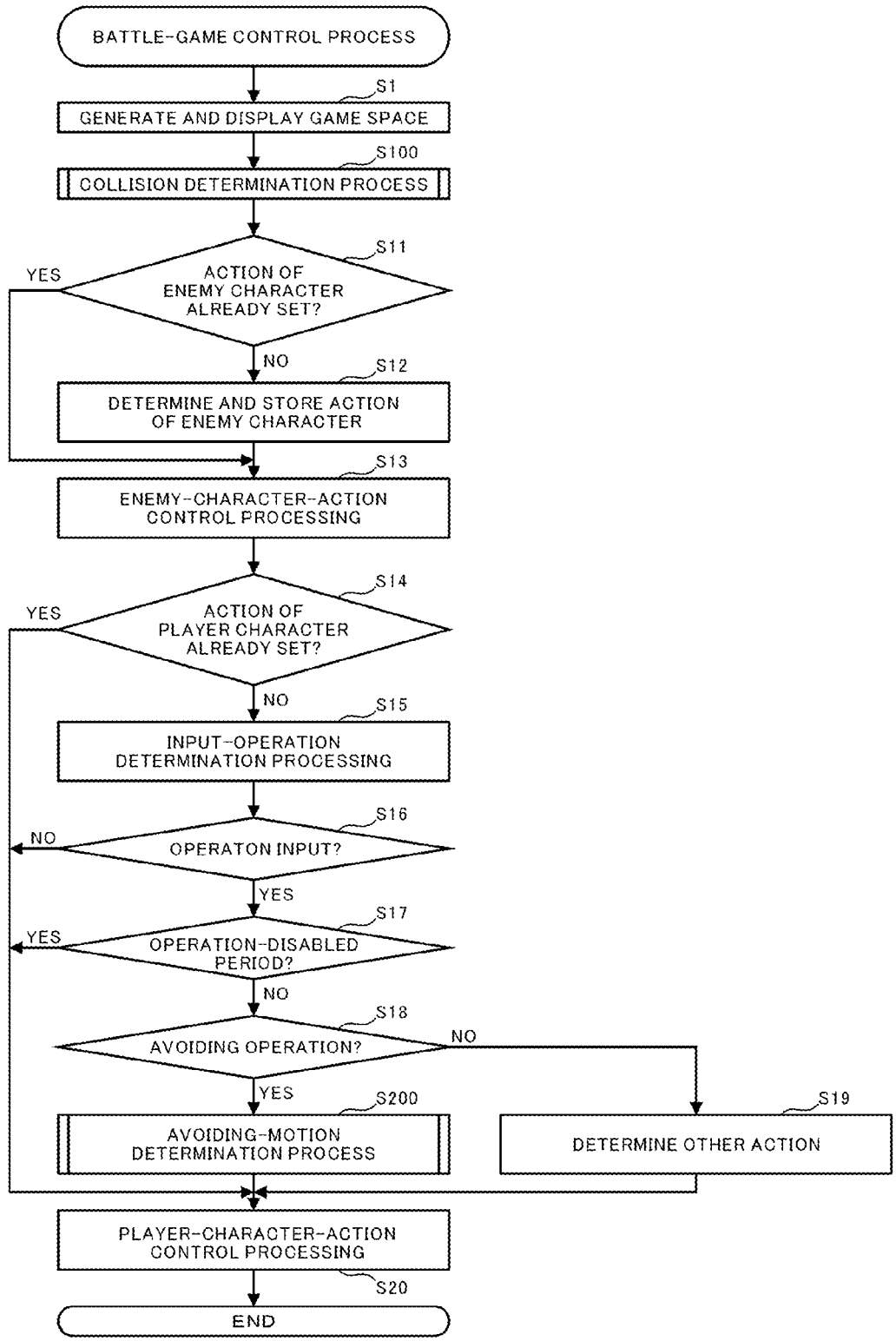
FIG. 14 is a flowchart for explaining a battle-game control process.

FIG. 14 is a flowchart showing an example of the battle-game control process. The battle-game control process in the game device 1 is executed at each image updating interval of the display 10. For example, the image updating interval, i.e., the frame rate, is 60 F/seconds, and thus the following battle-game control process is executed sixty times per second. Note that this frame rate is merely an example, and the frame rate may be designed as appropriate.

In the battle-game control process, the game-space generation unit 50a generates and displays the game space GS on the display 10 (S1). The collision determination unit 70a executes a collision determination process (S100) for determining whether or not an attack by the enemy character EC or the player character PC has hit the opponent. The collision determination process will be described with reference to FIG. 15.

Figure 15:
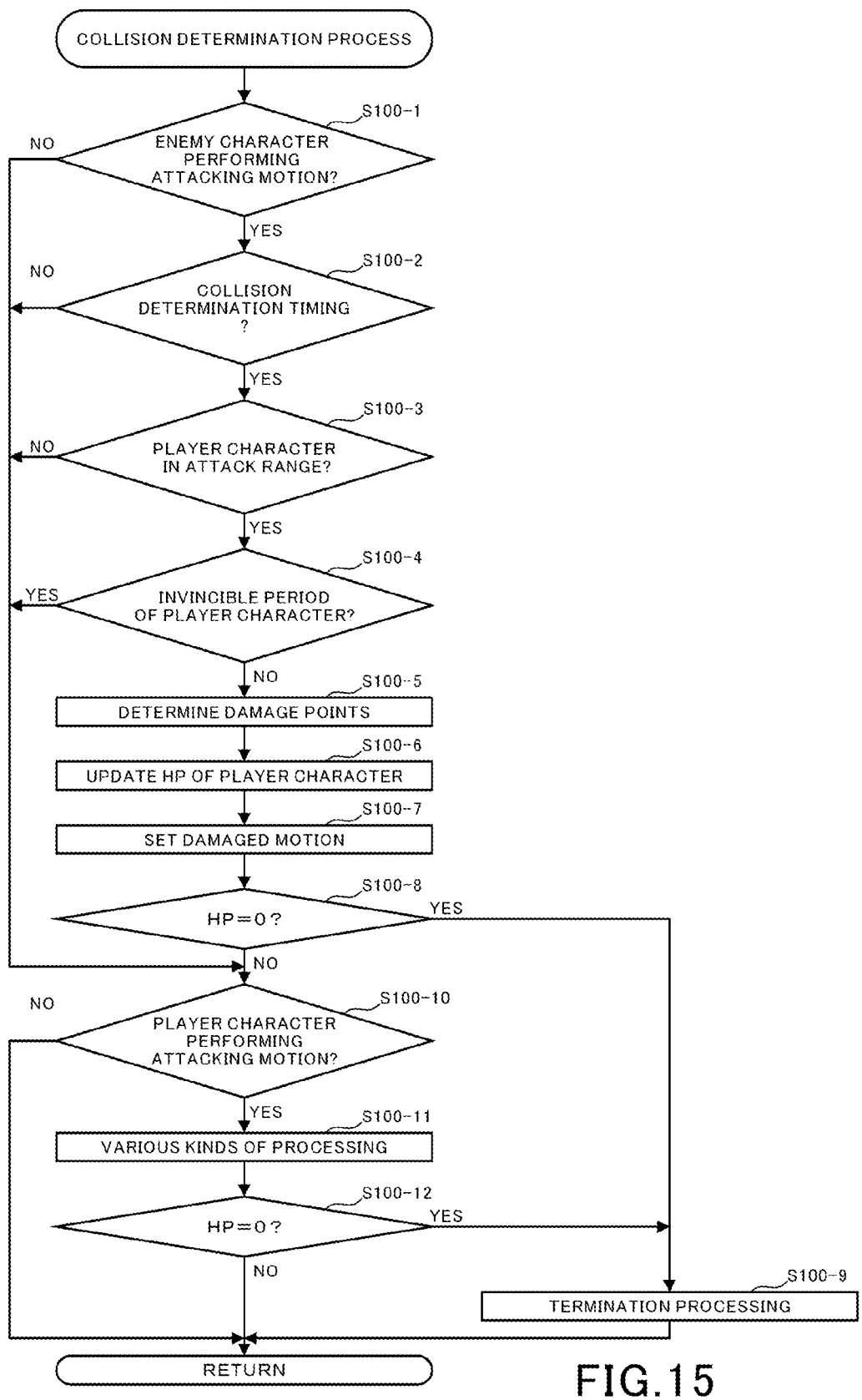
FIG. 15 is a flowchart for explaining a collision determination process.

FIG. 15 is a flowchart for explaining the collision determination process. The collision determination unit 70a determines whether the enemy character EC is performing an attacking motion on the basis of the information stored in the attack-type-information storage unit 84 (S100-1). Note that at the start of an attacking motion to be executed, attack type information indicating the attacking motion is stored in the attack-type-information storage unit 84. Furthermore, at the end of the attacking motion, the attack type information is deleted from the attack-type-information storage unit 84. Therefore, it is possible to check whether or not the enemy character EC is performing an attacking motion, as well as the type of the attacking motion being executed, on the basis of the information stored in the attack-type-information storage unit 84.

In the case where an attacking motion is being performed (YES in S100-1), the collision determination unit 70a determines whether or not a collision determination timing has arrived (S100-2). Note that collision determination timings are stored for individual attacking motions in advance in the data storage area 14b (see FIG. 4). Furthermore, the time elapsed since the start of an attacking motion is stored in the time-information storage unit 88. The collision determination unit 70a determines whether or not a collision determination timing has arrived on the basis of the information stored in the time-information storage unit 88 and the collision determination timings stored in the data storage area 14b.

If a collision determination timing has arrived (YES in S100-2), the collision determination unit 70a determines whether or not the player character PC is located within the attack range (S100-3). Here, it is determined whether or not the player character PC is in the attack range on the basis of the attack range information stored in the attack-range-information storage unit 86 and the position information of the player character PC stored in the player-character-position-information storage unit 82.

Note that in this embodiment, the attack range information is set when an attacking motion is started, and does not change as the time elapses, i.e., as the position of the enemy character EC (attacking part) changes. However, the attack range information may be changed according to the time elapsed from the start of an attacking motion.

In the case where the player character PC is located within the attack range (YES in S100-3), the collision determination unit 70a determines whether the player character PC is currently in an invincible period (an invincible state) (S100-4). Note that in this embodiment, a period before the elapse of a certain time (e.g., 0.7 seconds) from the start of an avoiding motion is set as an invincible period. The certain time is longer than or equal to the time from the start to the collision determination timing of any attacking motion of the enemy character EC (here, the longest time between the start to the collision determination timing of an attacking motion is 0.7 seconds). Therefore, in the case where an avoiding motion is started while an attacking motion is being executed, the player character PC always enters an invincible period (an invincible state) at the collision determination timing.

In the case where the player character PC is not in an invincible period (NO in S100-4), the collision determination unit 70a determines damage points to be assigned to the player character PC (S100-5). Here, the damage points are determined on the basis of various kinds of information, such as the type of attacking motion as well as the position and equipment of the player character PC.

Furthermore, the collision determination unit 70a subtracts the determined damage points from the life points HP of the player character PC, stored in the player-character-HP storage unit 92 (S100-6). Thus, the life points HP of the player character PC are updated. Furthermore, the battle-game control unit sets a damaged motion to be performed when the player character PC is damaged (S100-7).

When the life points HP of the player character PC have become zero (YES in S100-8), the battle-game control unit executes termination processing that is needed when terminating the battle game (S100-9). Meanwhile, when the life points HP of the player character PC have not become zero (NO in S100-8), the collision determination unit 70a determines whether or not the player character PC is performing an attacking motion (S100-10).

When the player character PC is performing an attacking motion (YES in S100-10), the collision determination unit 70a determines whether or not the attack by the player character PC has hit the enemy character EC, executes various kinds of processing, such as calculating and subtracting damage points, in the case where the attack has hit (S100-11). Then, when the life points HP of the enemy character EC have become zero (YES in S100-12), the battle-game control unit executes the termination processing mentioned above (S100-9).

Referring back to FIG. 14, the battle-game control unit determines whether or not an action of the enemy character EC has been set (S11). In the case where an action of the enemy character EC has not been set (NO in S11), the enemy-character-action determination unit 52a determines an action to be executed by the enemy character EC and stores the action in the data storage area 14b (S12). Note that in the case where an attacking motion has been determined by the enemy-character-action determination unit 52a, the attacking-motion setting unit 54a stores attack type information in the attack-type-information storage unit 84, and the attack-range setting unit 56a stores attack range information in the attack-range-information storage unit 86.

The enemy-character-action control unit 58a controls the displaying of the enemy character EC in the game space GS according to the timelines of various actions (motions) that have been set (S13).

Furthermore, in the case where an action of the player character PC has not been set (NO in S14), the input-operation determination unit 60a executes input-operation determination processing for analyzing the signal input from the controller 30 (S15). In the case where an operation has been input from the controller 30 (YES in S16), the battle-game control unit determines whether or not the player character PC is currently in an operation-disabled period (S17). Note that, for example, there are operation-disabled periods that are set in advance for individual actions, such as the period during an attacking motion or a damaged motion of the player character PC, and operation-disabled periods that are set independently of actions, such as status abnormalities of the player character PC.

When the player character PC is not in an operation-disabled period (NO in S17), the input-operation determination unit 60a determines whether or not the input operation is an avoiding operation (S18). If the input operation is not an avoiding operation (NO in S18), an action of the player character PC other than an avoiding motion is determined according to the input operation (S19). Here, for example, if an attacking operation has been input, the player-character-action determination unit 62a determines an attacking motion of the player character PC.

Meanwhile, if an avoiding operation has been input (YES in S18), the avoiding-motion determination unit 64a executes an avoiding-motion determination process (S200), which will be described later. The player-character-action control unit 68a causes the player character PC to perform an action according to an action (motion) newly determined or determined earlier (S20). Note that the player-character-action control unit 68a updates various kinds of information in the player-character-position-information storage unit 82 and the time-information storage unit 88 in association with the action control of the player character PC.

Figure 16:
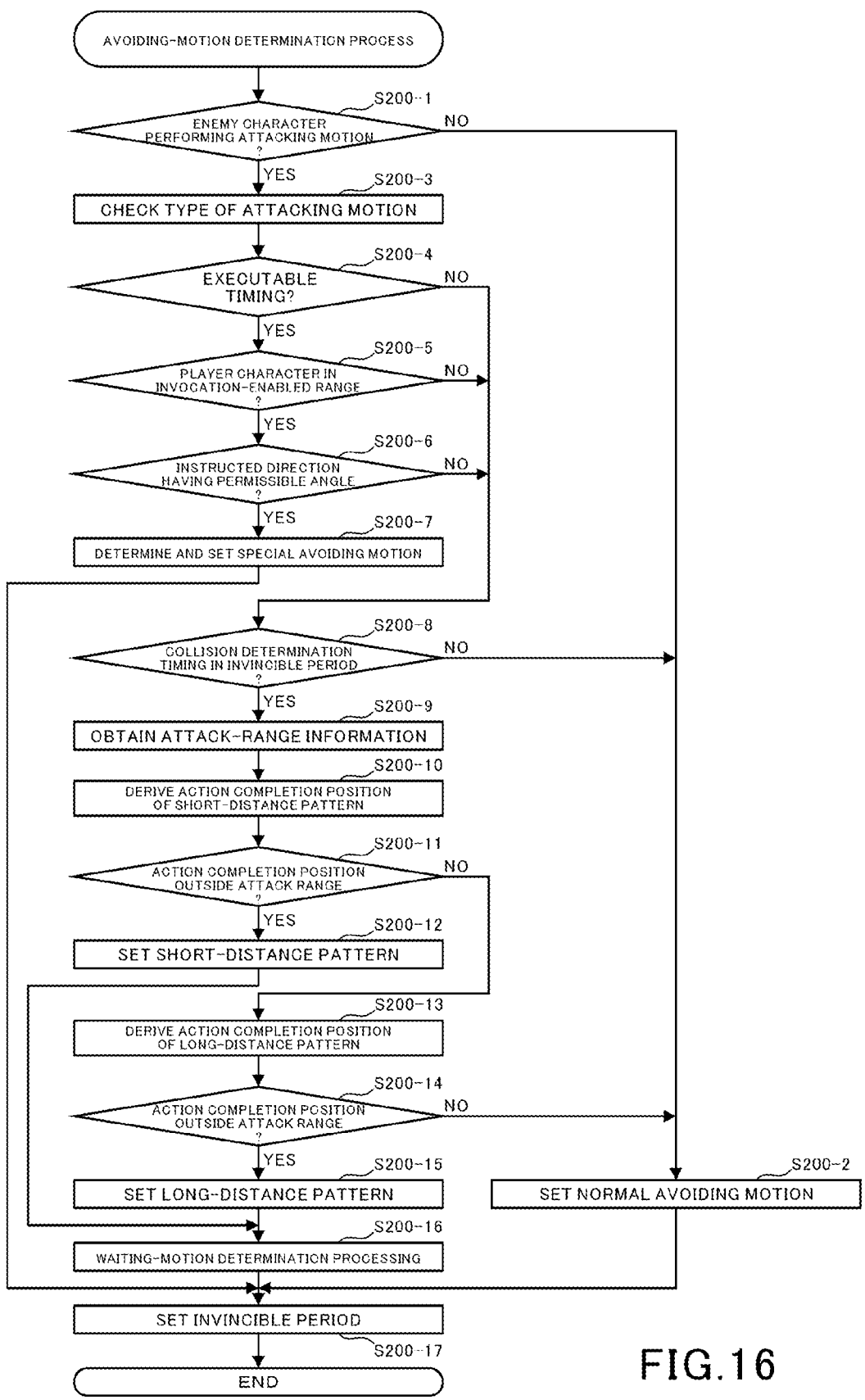
FIG. 16 is a flowchart for explaining an avoiding-motion determination process.

FIG. 16 is a flowchart for explaining the avoiding-motion determination process. The avoiding-motion determination unit 64a determines whether or not the enemy character EC is performing an attacking motion (S200-1). If the enemy character EC is not performing an attacking motion (NO in S200-1), the avoiding-motion determination unit 64a sets the normal avoiding motion (stores information indicating the normal avoiding motion in the data storage area 14b) (S200-2). Thus, the player-character-action control unit 68a causes the player character PC to perform the normal avoiding motion (S20 in FIG. 14).

Meanwhile, if the enemy character EC is performing an attacking motion (YES in S200-1), the avoiding-motion determination unit 64a checks the attack type information of the enemy character EC, stored in the attack-type-information storage unit 84 (S200-3). Then, the avoiding-motion determination unit 64a determines whether or not the current timing allows the execution of the special avoiding motion (S200-4). Note that invocation-enabled timings are stored for individual attacking motions in advance in the data storage area 14b (see FIG. 12B). Furthermore, the time elapsed since the start of the attacking motion is stored in the time-information storage unit 88. The avoiding-motion determination unit 64a determines whether or not the current timing allows the execution of the special avoiding motion on the basis of the information stored in the time-information storage unit 88 and the invocation-enabled timings stored in the data storage area 14b.

In the case where it is determined that the current timing allows the execution of the special avoiding motion (YES in S200-4), the avoiding-motion determination unit 64a determines whether or not the player character PC is located within an invocation-enabled range Ba. Note that invocation enabled ranges Ba are stored for individual attacking motions in advance in the data storage area 14b (see FIG. 12C). The avoiding-motion determination unit 64a determines whether or not the player character PC is located within the invocation-enabled range Ba on the basis of the position information of the player character PC, stored in the player-character-position-information storage unit 82, and the invocation-enabled range Ba stored in the data storage area 14b.

In the case where it is determined that the player character PC is located within the invocation-enabled range Ba (YES in S200-5), the avoiding-motion determination unit 64a determines whether the instructed direction of the avoiding motion has a permissible angle (S200-6). Note that permissible angles of the instructed directions of avoiding operations are stored for individual attacking motions in advance in the data storage area 14b (see FIG. 12D).

If the instructed direction of the avoiding operation has a permissible angle (YES in S200-6), the avoiding-motion determination unit 64a determines an action pattern of the special avoiding motion and sets the action pattern in the data storage area 14b (S200-7). Thus, the player-character-action control unit 68a causes the player character PC to execute the special avoiding motion (S20 in FIG. 14). Note that in S200-7, the avoiding-motion determination unit 64a determines an action pattern of the special avoiding motion on the basis of the attacking motion of the player character PC being executed and the invocation-enabled range Ba in which the player character PC is located.

Furthermore, in the case where one of the determinations in S200-4 to S200-6 described above results in NO, i.e., in the case where it is determined that the special invocation condition is not satisfied, the avoiding-motion determination unit 64a determines whether the collision determination timing falls in an invincible period (S200-8). Specifically, the avoiding-motion determination unit 64a obtains the collision determination timing set for the attacking motion of the enemy character EC. Then, if the collision determination timing does not fall in an invincible period of the player character PC (NO in S200-8), the avoiding-motion determination unit 64a sets the normal avoiding motion (S200-2).

Meanwhile, if the collision determination timing falls in an invincible period of the player character PC (YES in S200-8), the avoiding-motion determination unit 64a obtains the attack range information of the enemy character EC, stored in the attack-range-information storage unit 86 (S200-9).

Furthermore, the avoiding-motion determination unit 64a derives an action completion position for the case where it is assumed that an action of the "short-distance pattern", corresponding to the attacking motion of the enemy character EC and the instructed direction, has been executed (S200-10). Note that here, the position of the player character PC at the time of the input of the avoiding operation may be referred to instead of the action completion position.

If the action completion position falls outside the attack range of the enemy character EC (YES in S200-11), the avoiding-motion determination unit 64a sets an action pattern of "short-distance pattern", corresponding to the attacking motion of the enemy character EC and the instructed direction (S200-12). Meanwhile, if the action completion position does not fall outside the attack range of the enemy character EC (NO in S200-11), the avoiding-motion determination unit 64a derives an action completion position for the case where it is assumed that an action of "long-distance pattern", corresponding to the attacking motion of the enemy character EC and the instructed direction, has been executed (S200-13).

If the action completion position does not fall outside the attack range of the enemy character EC (NO in S200-14), the avoiding-motion determination unit 64a sets the normal avoiding motion (S200-2). Meanwhile, if the action completion position falls outside the attack range of the enemy character EC (YES in S200-14), the avoiding-motion determination unit 64a sets an action pattern of "long-distance pattern", corresponding to the attacking motion of the enemy character EC and the instructed direction (S200-15).

When the generic avoiding motion of "short-distance pattern" or "long-distance pattern" has been set, the waiting-motion determination unit 66a determines whether or not the waiting motion is to be executed before the execution of the generic avoiding motion (S200-16). Specifically, the start-enabled timing of the generic avoiding motion is stored in the data storage area 14b (see FIG. 9A). Furthermore, action patterns of the waiting motion are stored for individual instructed directions of avoiding operations in the data storage area 14b (see FIG. 9B).

The waiting-motion determination unit 66a determines whether or not the time elapsed since the start of the attacking motion of the enemy character EC has reached the start-enabled timing. If it is determined as a result that the time elapsed has reached the start-enabled timing, it is determined that the waiting motion is not to be executed. Meanwhile, if the time elapsed has not reached the start-enabled timing, an action pattern of the waiting motion, corresponding to the instructed direction of the avoiding operation, is determined and is set in the data storage area 14b. Note that in the case where an action pattern of the waiting motion has been determined, the timeline is set so that the action pattern of the generic avoiding motion, set in S200-12 or S200-15 described above, will be started from the start-enabled timing.

Then, in the case where one of the avoiding motions has been set, the avoiding-motion determination unit 64a sets a time for an invincible period (an invincible time) in the time-information storage unit 88 (S200-17). Here, a timer value is set in the time-information storage unit 88, and this timer value is decremented in S20 in FIG. 14. It is determined that the player character PC is in an invincible period in the case where the timer value is greater than zero.

Although an aspect of the embodiment has been described with reference to the accompanying drawings, it is needless to say that the present invention is not limited to the embodiment described above. It is obvious that a person skilled in the art could conceive of various variations and modifications within the scope recited in claims, and it will be understood that those variations and modifications naturally fall within the technical scope of the present invention.

For example, the display modes of the player character PC and the enemy character EC in the embodiment described above are merely examples. In any case, it suffices for a target object disposed in the virtual game space GS to perform one of actions at least including an attacking motion.

Furthermore, in the embodiment described above, in the case where an avoiding operation is executed during an attacking motion of the enemy character EC, the type of the avoiding motion and an action pattern of the avoiding motion are determined. However, operations that may be executed during an attacking motion are not limited to an avoiding operation. For example, in the case where a predetermined attacking operation has been input during an attacking motion of the enemy character EC, the player character PC may execute what is called a counter motion, in which the player character PC performs an action to damage the enemy character EC while avoiding the attack by the opponent.

In any case, it suffices that one of the action patterns is determined in the case where a specific operation with which it is possible to identify the instructed direction in the game space GS is input during an attacking motion of a target object. Furthermore, there is no particular limitation concerning the specific operation mode of the specific operation as long as it is possible to identify the instructed direction in the game space GS.

In the embodiment described above, the special avoiding motion, the generic avoiding motion, and the normal avoiding motion are provided as avoiding motion. However, for example, it is possible to provide only a plurality of action patterns having different movement distances or action modes as normal avoiding motions, and one of the action patterns of the normal avoiding motions may be determined in accordance with an avoiding operation. That is, the action patterns of the individual avoiding motions in the embodiment described above are merely examples, and the action patterns may be designed as appropriate.

Furthermore, in the embodiment described above, attack range information associated with an attacking motion of the enemy character EC is set. Furthermore, whether or not a collision occurs is determined on the basis of the attack range information and the position information of the player character PC. Furthermore, in the case where an avoiding operation has been input, an action pattern of the generic avoiding motion is determined in accordance with whether or not the action completion position of the player character PC is included in the attack range information. Therefore, it can be said that the attack range information is included in information that is used to determine an action pattern of the player character PC in the embodiment described above.

Furthermore, the attack range information is set in accordance with both the position and an action of the enemy character EC. That is, it can be said that an action pattern of the player character PC is determined in accordance with both the position and an action of the enemy character EC in the embodiment described above. However, for example, an action pattern may be determined on the basis of either the position information or an action (motion) of the enemy character EC in the case where an avoiding operation has been input.

Furthermore, in the embodiment described above, whether or not a collision occurs is determined at a preset collision determination timing between the start and the end of an attacking motion. Furthermore, the normal avoiding motion is determined in the case where it is determined that a collision occurs, and the generic avoiding motion is determined in the case where it is determined that a collision does not occur. Therefore, it can be said that an action pattern is determined on the basis of a collision determination timing in the embodiment described above. Furthermore, it can also be said that an action pattern is determined on the basis of the position information of the player character PC disposed in the game space GS, the instructed direction of an avoiding operation, and the input timing of the avoiding operation in the embodiment described above.

Furthermore, in the embodiment described above, a plurality of kinds of attacking motions of the enemy character EC are provided, and selectable action patterns of the special avoiding motion are associated in advance with the individual attacking motions. Furthermore, for the special avoiding motion, it is possible to determine an action pattern associated with the type of the attacking motion being controlled.

Meanwhile, action patterns of the generic avoiding motion are set for individual instructed directions of avoiding operations. However, it is also possible to provide action patterns of the generic avoiding motion for the individual types of attacking motions, and an action pattern associated with the type of the attacking motion being controlled may be determined. Furthermore, action patterns may be set individually for instructed directions of avoiding operations also for the special avoiding motion, similarly to the generic avoiding motion.

Furthermore, the waiting motion in the embodiment described above is not necessary. Therefore, in the case where an avoiding operation has been input, an avoiding motion may be started immediately irrespective of the input timing of the avoiding operation.

As described above, in the embodiment described above, individual action patterns for the special avoiding motion, the generic avoiding motion, and the normal avoiding motion are determined on the basis of various kinds of information. However, it suffices that, in the case where an avoiding operation (specific operation) with which it is possible to identify the instructed direction in the game space GS is input during an attacking motion of the enemy character EC (target object), an action pattern of the player character PC is determined at least on the basis of determination information set in accordance with either one of or both of the position and an action of the enemy character EC (target object), the position information of the player character PC (player object) disposed in the game space GS, the instructed direction of the avoiding operation (specific operation), and the input timing of the avoiding operation (specific operation).

Furthermore, the control processes in the embodiment described above are merely examples. In the embodiment described above, the control process for executing the battle game is executed at the game device 1. However, the control process for executing the battle game may be executed, for example, concurrently at the game device 1 and the server 2. That is, the information processing system S, which is a client-server system, may execute the control processes described above.

Furthermore, in the embodiment described above, the program for realizing the battle game may be stored in a computer-readable storage medium. Furthermore, the embodiment described above may be an information processing method for realizing the functions and the steps shown in the flowcharts.

INDUSTRIAL APPLICABILITY

The present invention is applicable to information processing programs, information processing methods, and game devices.

What is claimed is:

1. A non-transitory computer readable medium storing a program causing a computer to perform a method comprising:
   displaying a player object and a target object on a virtual game space;
   controlling a plurality of actions of the target object, wherein the plurality of actions comprise at least one attacking motion;
   determining, in response to a specific operation indicating a direction of action of the player object being input during the at least one attacking motion of the target object, a plurality of action completion positions for a plurality of action patterns,
      wherein the player object is moved to a respective action completion position among the plurality of action completion positions for a respective action pattern among the plurality of action patterns based on the specific operation being input during the at least one attacking motion;
   selecting an action pattern of the player object among the plurality of action patterns based on at least one of a position of the target object and an action of the target object, and further based on the respective action completion position for the action pattern and an input timing of the specific operation; and
   moving the player object in accordance with the selected action pattern.

2. The non-transitory computer readable medium according to claim 1, wherein the method further comprises:
   setting an attack range with respect to an attacking motion; and
   determining whether a collision between the player object and the target object occurs, based at least on the attack range and the position of the player object,
   wherein selecting the action pattern of the player object comprises selecting the action pattern based on whether the respective action completion position among the plurality of action completion positions is within an attack range.

3. The non-transitory computer readable medium according to claim 2,
   wherein determining whether the collision occurs comprises determining whether the collision occurs within a preset collision determination timing between a beginning and an end of the attacking motion, and
   wherein selecting the action pattern of the player object comprises selecting the action pattern on the basis of the preset collision determination timing.

4. The non-transitory computer readable medium according to claim 1,
   wherein the program comprises a plurality of attacking motions of the target object, each of the plurality of attacking motions being associated with at least one action pattern of the player object, and
   wherein selecting the action pattern of the player object comprises selecting the action pattern associated with the plurality of executed attacking motion.

5. The non-transitory computer readable medium according to claim 4,
   wherein the program comprises a base point moving with the target object, and
   wherein moving the player object comprises moving the player object on the basis of the base point.

6. The non-transitory computer readable medium according to claim 1, wherein the selected action pattern comprises a waiting motion that is executed over a waiting period set in accordance with the input timing of the specific operation.

7. An information processing method comprising:
   displaying a player object and a target object on a virtual game space;
   controlling a plurality of actions of the target object, wherein the plurality of actions comprise at least one attacking motion;
   determining, in response to a specific operation indicating a direction of action of the player object being input during the at least one attacking motion of the target object, a plurality of action completion positions for a plurality of action patterns,
      wherein the player object is moved to a respective action completion position among the plurality of action completion positions for a respective action pattern among the plurality of action patterns based on the specific operation being input during the at least one attacking motion;
   selecting an action pattern of the player object among the plurality of action patterns based on at least one of a position of the target object and an action of the target object, and further based on the respective action completion position for the action pattern and an input timing of the specific operation; and
   moving the player object in accordance with the selected action pattern.

8. A game device comprising a computer configured to perform a method comprising:
   displaying a player object and a target object on a virtual game space;
   controlling a plurality of actions of a target object, wherein the plurality of actions comprise at least one attacking motion;
   determining, in response to a specific operation indicating a direction of action of the player object being input during the at least one attacking motion of the target object, a plurality of action completion positions for a plurality of action patterns,
      wherein the player object is moved to a respective action completion position among the plurality of action completion positions for a respective action pattern among the plurality of action patterns based on the specific operation being input during the at least one attacking motion;
   selecting an action pattern of the player object among the plurality of action patterns based on at least one of a position of the target object and an action of the target object, and further based on the respective action completion position for the action pattern and an input timing of the specific operation; and
   moving the player object in accordance with the selected action pattern.

* * * * *